United States Patent
Chan

(10) Patent No.: US 10,375,317 B2
(45) Date of Patent: Aug. 6, 2019

(54) LOW COMPLEXITY AUTO-EXPOSURE CONTROL FOR COMPUTER VISION AND IMAGING SYSTEMS

(71) Applicant: QUALCOMM Incorporated, San Diego, CA (US)

(72) Inventor: Victor Chan, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/642,303

(22) Filed: Jul. 5, 2017

(65) Prior Publication Data

US 2018/0048829 A1   Feb. 15, 2018

Related U.S. Application Data

(60) Provisional application No. 62/359,624, filed on Jul. 7, 2016.

(51) Int. Cl.
*H04N 5/243*   (2006.01)
*G06K 9/46*    (2006.01)
(Continued)

(52) U.S. Cl.
CPC .......... *H04N 5/243* (2013.01); *G06K 9/4604* (2013.01); *G06K 9/4647* (2013.01);
(Continued)

(58) Field of Classification Search
None
See application file for complete search history.

(56) References Cited

U.S. PATENT DOCUMENTS

2008/0024616 A1* 1/2008 Takahashi ............ H04N 5/2351
                                                            348/221.1
2009/0021602 A1* 1/2009 Fujiwara ............ H04N 5/23219
                                                            348/223.1
(Continued)

FOREIGN PATENT DOCUMENTS

DE    102008052930 A1   4/2010

OTHER PUBLICATIONS

Suarez M., et al., "CMOS-3D Smart Imager Architectures for Feature Detection", IEEE Journal on Emerging and Selected Topics in Circuits and Systems, IEEE, Piscataway, NJ, USA, vol. 2, No. 4, Dec. 1, 2012 (Dec. 1, 2012), pp. 723-736, XP011479510, ISSN: 2156-3357, DOI: 10.1109/JETCAS.2012.2223552.

(Continued)

*Primary Examiner* — Twyler L Haskins
*Assistant Examiner* — Wesley J Chiu
(74) *Attorney, Agent, or Firm* — Kilpatrick Townsend & Stockton

(57) ABSTRACT

Methods, apparatuses, computer-readable medium, and systems are disclosed for performing automatic exposure control (AEC). In one embodiment, a first digital image is captured while applying a first set of values to one or more exposure control parameters. At least one computer vision (CV) operation is performed using image data from the first digital image, thereby generating a first set of CV features from a set of possible CV features. A mask is obtained comprising a value for each feature of the set of possible CV features. Using the mask, a first measure of abundance is obtained of relevant CV features among the first set of CV features extracted from the first digital image. Based on the first measure of abundance of relevant CV features, an updated set of values is generated for applying to the one or (Continued)

US 10,375,317 B2

Page 2 more exposure control parameters for capturing a subsequent digital image of the scene.

30 Claims, 21 Drawing Sheets

(51) Int. Cl.
*G06K 9/62* (2006.01)
*H04N 5/235* (2006.01)
*G06K 9/60* (2006.01)

(52) U.S. Cl.
CPC ......... *G06K 9/6202* (2013.01); *H04N 5/2353* (2013.01); *G06K 9/60* (2013.01)

(56) References Cited

U.S. PATENT DOCUMENTS

| | | | | |
|---|---|---|---|---|
| 2009/0136152 A1* | 5/2009 | Kameyama | ............. | H04N 1/60 382/275 |
| 2010/0165178 A1* | 7/2010 | Chou | ................... | G03B 13/32 348/371 |
| 2010/0201848 A1* | 8/2010 | Fukui | ................. | H04N 5/23219 348/234 |
| 2011/0096085 A1* | 4/2011 | Cha | ......................... | G06T 5/009 345/589 |
| 2011/0211732 A1 | 9/2011 | Rapaport | | |
| 2012/0081579 A1* | 4/2012 | Doepke | ................ | H04N 5/2355 348/231.99 |
| 2012/0212642 A1* | 8/2012 | Kehtarnavaz | .......... | H04N 5/235 348/222.1 |
| 2014/0003663 A1 | 1/2014 | Li et al. | | |
| 2014/0176789 A1* | 6/2014 | Kubota | .............. | H04N 5/23219 348/362 |
| 2014/0184852 A1 | 7/2014 | Niemi et al. | | |
| 2014/0218559 A1* | 8/2014 | Yamaguchi | .......... | H04N 5/2352 348/229.1 |
| 2014/0347511 A1 | 11/2014 | Rodriguez-Serrano et al. | | |
| 2015/0199559 A1 | 7/2015 | Sztuk et al. | | |
| 2016/0092735 A1 | 3/2016 | Govil et al. | | |
| 2016/0094814 A1 | 3/2016 | Gousev et al. | | |
| 2017/0064211 A1 | 3/2017 | Omid-Zohoor | | |

OTHER PUBLICATIONS

International Search Report and Written Opinion—PCT/US2017/040952—ISA/EPO—Sep. 22, 2017.
Yang X., et al., "Visage: A Face Interpretation Engine for Smartphone Applications", International Conference on Mobile Computing, Applications, and Services, 2012, pp. 1-20.

* cited by examiner

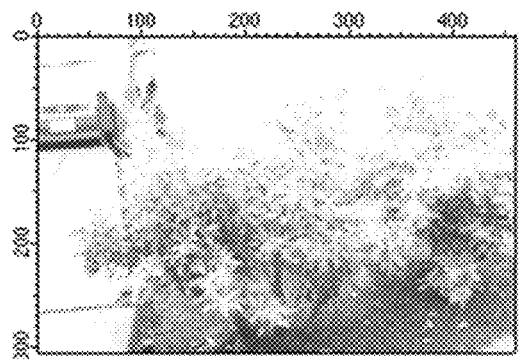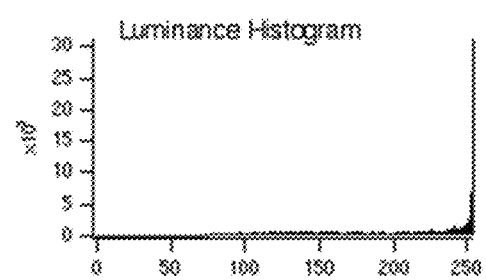
Fig. 1A
Fig. 1B
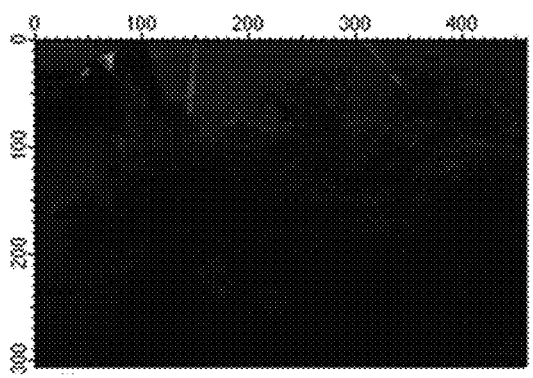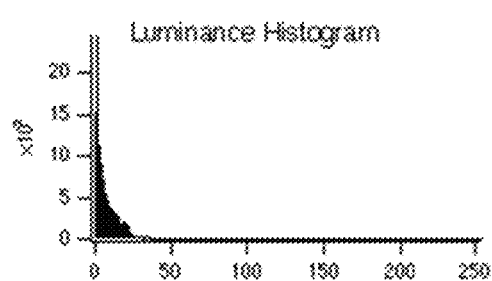
Fig. 2A
Fig. 2B

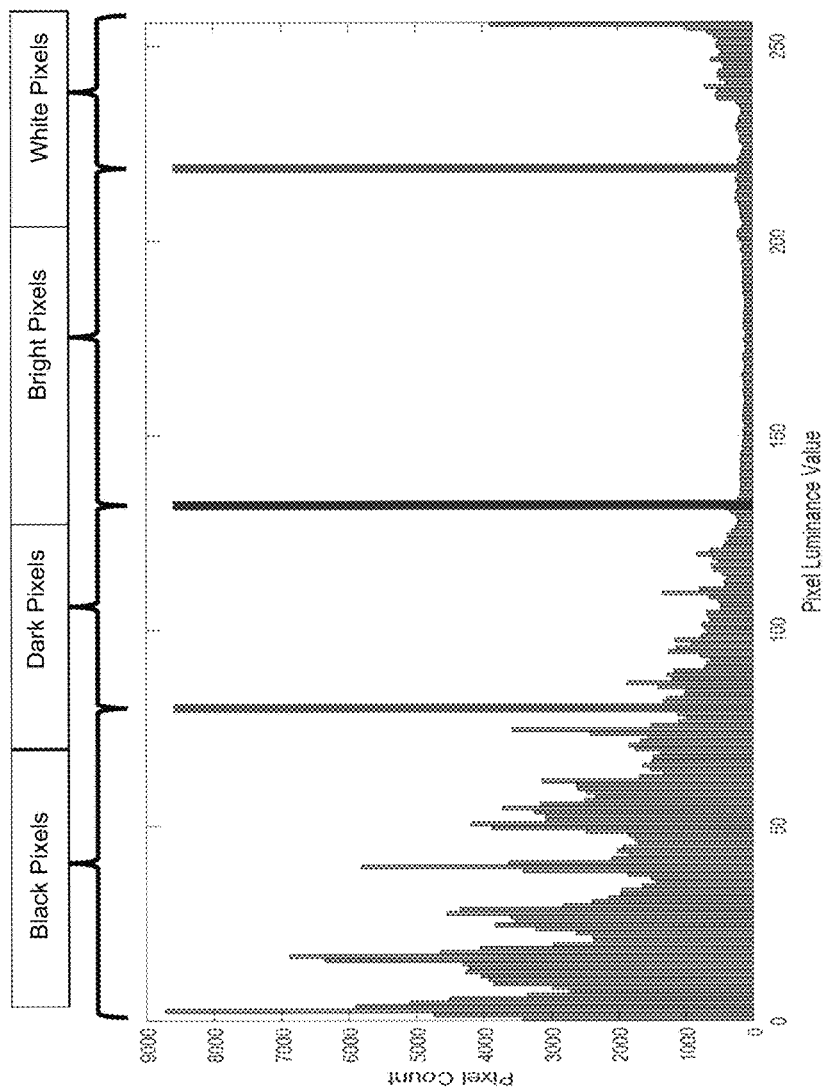
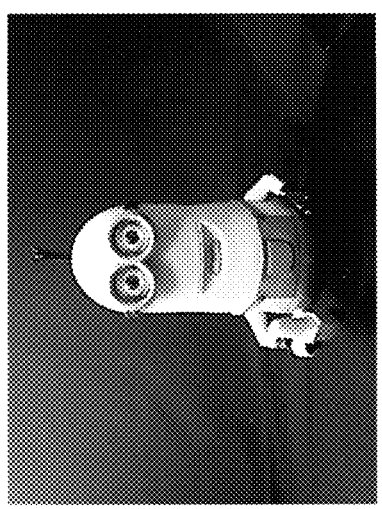
Fig. 7B
Fig. 7A

LOW COMPLEXITY AUTO-EXPOSURE CONTROL FOR COMPUTER VISION AND IMAGING SYSTEMS

CROSS-REFERENCE TO RELATED APPLICATIONS

This application claims the benefit of U.S. Provisional Application No. 62/359,624, filed Jul. 7, 2016, entitled "LOW COMPLEXITY AUTO-EXPOSURE CONTROL FOR COMPUTER VISION AND IMAGING SYSTEMS" which is incorporated herein by reference.

SUMMARY

Various embodiments are presented for performing automatic exposure control (AEC). According to one embodiment for performing computer vision based automatic exposure control (CV AEC), a first digital image of a scene is captured using an image sensor while applying a first set of values to one or more exposure control parameters. At least one computer vision (CV) operation is performed using image data from the first digital image, thereby generating a first set of CV features extracted from the first digital image, wherein the first set of CV features are from a set of possible CV features. A mask is obtained comprising a value for each feature of the set of possible CV features. Using the mask, a first measure of abundance is obtained of relevant CV features among the first set of CV features extracted from the first digital image. Based on the first measure of abundance of relevant CV features, an updated set of values is generated for applying to the one or more exposure control parameters for capturing a subsequent digital image of the scene.

According to another embodiment for performing CV AEC, further steps are performed. A second digital image of the scene is captured using the image sensor while applying a second set of values to the one or more exposure control parameters. A third digital image of the scene is captured using the image sensor while applying a third set of values to the one or more exposure control parameters. The first set of values may correspond to a nominal level of exposure, the second set of values corresponds to a level of exposure greater than the nominal level, and the third set of values corresponds to a level of exposure less than the nominal level. The at least one CV operation is performed using image data from the second digital image thereby generating a second set of CV features extracted from the second digital image, wherein the second set of CV features are also from the set of possible CV features. Using the mask, a second measure of abundance is obtained of relevant CV among the second set of CV features extracted from the second digital image. The at least one CV operation is performed using image data from the third digital image thereby generating a third set of CV features extracted from the third digital image, wherein the third set of CV features are also from the set of possible CV features. Using the mask, a third measure of abundance is obtained of relevant CV features among the third set of CV features extracted from the third digital image. Generating the updated set of values may comprise: (a) comparing the first measure of abundance of relevant CV features, the second measure of abundance of relevant CV features, and the third measure of abundance of relevant CV features to determine a greatest measure of abundance of relevant CV features and (b) selecting one of the first set of values, second set of values, or third set of values corresponding to the greatest measure of abundance of relevant CV features as the updated set of values.

According to one embodiment for performing combined CV AEC and non-computer vision based automatic exposure control (non-CV AEC). In the CV AEC loop, a first digital image of a scene is captured using an image sensor while applying a first set of values to one or more exposure control parameters. At least one computer vision (CV) operation is performed using image data from the first digital image, thereby generating a first set of CV features extracted from the first digital image, wherein the first set of CV features are from a set of possible CV features. A mask is obtained comprising a value for each feature of the set of possible CV features. Using the mask, a first measure of abundance is obtained of relevant CV features among the first set of CV features extracted from the first digital image. Based on the first measure of abundance of relevant CV features, an updated set of values is generated for applying to the one or more exposure control parameters for capturing a subsequent digital image of the scene.

In the non-CV AEC loop a digital image of the scene is captured using the image sensor while applying a non-CV AEC set of values to the one or more exposure control parameters. A histogram of pixel brightness is generated using image data from the digital image. A desired exposure adjustment is determined based on the histogram of pixel brightness. Based on the desired exposure adjustment, an updated non-CV AEC set of values is generated for applying to the one or more exposure control parameters for capturing the subsequent digital image of the scene.

According to one embodiment, the histogram of pixels may comprise a first bin associated with a first range of brightness values and a second bin associated with a second range of brightness values. The desired exposure adjustment may be determined based on at least one brightness ratio based on (a) a dark-bin value representing a pixel count of the first bin and (b) a bright-bin value representing a pixel count of the second bin. An example of such an embodiment is referred to as "Frame Average AEC." According to another embodiment, the histogram of pixel brightness may further comprise a third bin associated with a third range of brightness values and a fourth bin associated with a fourth range of brightness value. The at least one brightness ratio may comprise a limited brightness ratio based on (a) the dark-bin value and (b) the bright-bin value, as well as an expanded brightness ratio based on (a) the dark-bin value and a black-bin value representing a pixel count of the third bin and (b) the bright-bin value and a white-bin value representing a pixel count of the fourth bin. An example of such an embodiment is referred to "Filtered Frame Average AEC." Determining the desired exposure adjustment may further comprise selecting either the limited brightness ratio or the expanded brightness ratio, based on a comparison of (a) a value including the dark-bin value and the bright-bin value and (b) a value including the black-bin value and the white-bin value, as a selected brightness ratio, as well as using the selected brightness ratio to determine the desired exposure adjustment.

BACKGROUND

Aspects of the disclosure relate to automatic exposure control. For an image sensor to produce a useable signal, the sensor must adjust its gains and exposure parameters such that output signals lie within the dynamic range of the sensor. Overexposure leads to over-saturated pixels at the high end of the dynamic range. FIG. 1A illustrates an example of an over-exposed image. FIG. 1B is a luminance histogram associated with the over-exposed image shown in FIG. 1A. By contrast, underexposure leads to under-saturated pixels at the low end of the dynamic range. FIG. 2A illustrates an example of an under-exposure image. FIG. 2B is a luminance histogram associated with the under-exposure image shown in FIG. 2A. In both the over-exposed and under-exposure cases, the resultant image's dynamic range is reduced. Therefore, in order to consistently produce images with the widest dynamic range, it is desirable for a sensor to have a control system that automatically adjusts its exposure settings such that both over- or under-exposures are avoided. This control algorithm is commonly referred to as the Automatic Exposure Control, or AEC. Existing AEC techniques mainly rely on balancing of the pixel brightness distribution of an image. Without more, existing AEC technique have significant limitations.

BRIEF DESCRIPTION OF THE DRAWINGS

Aspects of the disclosure are illustrated by way of example. In the accompanying figures, like reference numbers indicate similar elements. The figures are briefly described below:

FIG. 1A illustrates an example of an over-exposed image;

FIG. 1B is a luminance histogram associated with the over-exposed image shown in FIG. 1A;

FIG. 2A illustrates an example of an under-exposed image;

FIG. 2B is a luminance histogram associated with the under-exposure image shown in FIG. 2A;

FIG. 7A illustrates the same black content-dominated image with Filtered Frame Average AEC applied, which leads to balancing of only the "grey" pixel energy;

FIG. 7B is a luminance histogram associated with the Filtered Frame Average AEC corrected image shown in FIG. 7A;

DETAILED DESCRIPTION

Figure 3A:
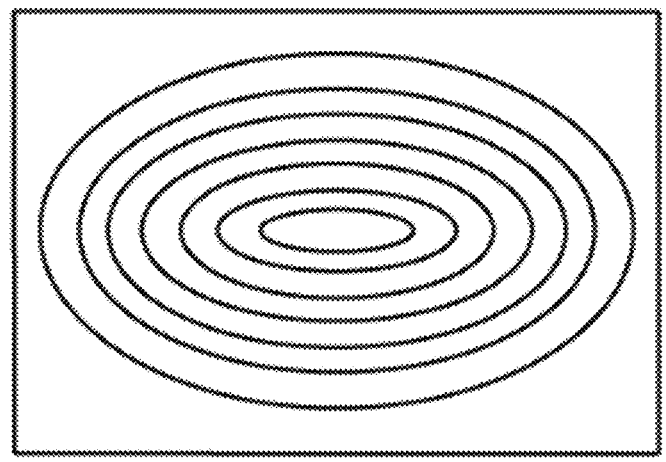
FIG. 3A depicts an example of center-weighted metering AEC.

Several illustrative embodiments will now be described with respect to the accompanying drawings, which form a part hereof. While particular embodiments, in which one or more aspects of the disclosure may be implemented, are described below, other embodiments may be used and various modifications may be made without departing from the scope of the disclosure or the spirit of the appended claims.

Non-Computer Vision Based Automatic Exposure Control (Non-CV AEC)

Various embodiments of the disclosure implement non-computer vision based automatic exposure control (non-CV AEC). These are techniques that accomplish automatic exposure control without taking into account effects of exposure control on computer vision (CV) operations. Computer vision (CV) operations and automatic exposure control techniques that take into account CV operations are discussed in later sections of the present disclosure. For now, attention is directed to novel techniques for non-CV AEC.

Many basic non-CV AEC algorithms target the "middle gray" or commonly called "18% gray" to expose an image. The basic assumption is that an image of a typical natural scene is composed of, on average, pixels of "middle gray" levels of luminance (there are exceptions to such an assumption, as discussed in subsequent sections). Therefore, if a sensor is exposed for creating an image of "middle gray" pixels, then the image may be considered properly exposed. In practice, in the case of a color Red-Green-Blue (RGB) sensor, the luminance of an image can be computed by converting the RGB values into an "L-a-b" color space so that the luminance value, L, can be extracted. As is known to one of ordinary skill in the art, the "L-a-b" color space generally refers to a color-opponent space with dimension "L" for lightness/luminance and "a" and "b" for the color-opponent dimensions. Then with the application of a non-linear gain—gamma correction—the average luminance value of an image should ideally lie somewhere near the middle of the dynamic range, which would be 50 if L has a range of 0 to 100, for example. However, if the average luminance value is not in the middle (50), then there may be a number of control parameters that can be adjusted, including: (1) exposure time, (2) gain, and (3) aperture. With regard to exposure time, if L is too low, then the exposure time can be lengthened to increase the luminance in an image. Conversely, if L is too high, then the exposure time can be shortened. Since exposure time adjustment has its limit depending on the sensor's available frame rates, if adjusting exposure time alone cannot sufficiently achieve the targeted luminance value, then the gain (e.g., the AEC gain) associated with the image sensor can be adjusted to scale the luminance value in the image. The gain is sometimes referred to as the "analog gain" because it is applied before the image is captured and digitized. This is in contrast to "digital gain" which generally refers to the scaling of pixel values after the image has been captured. With regard to aperture, if L is too high, then the aperture can be reduced. Conversely, if L is too low, the aperture can be enlarged. Control of parameters such as exposure time, gain, and aperture in response to luminance values can form the basic feedback control of an AEC algorithm in accordance with embodiments of the present disclosure.

Figure 3B:
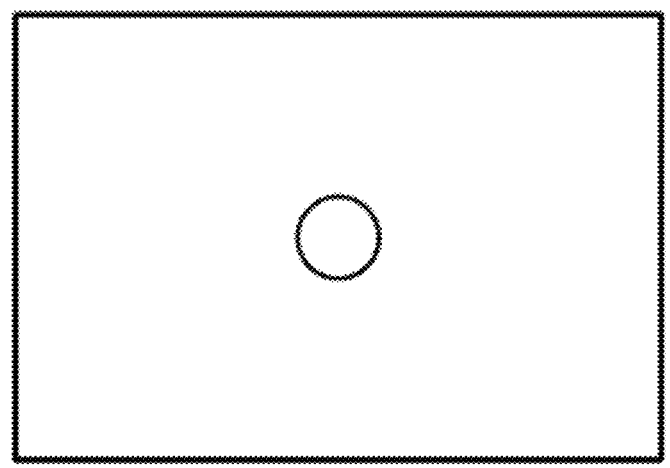
FIG. 3B depicts an example of spot-metering AEC.

According to some embodiments, more sophisticated non-CV AEC algorithms introduce regional biases instead of using a global pixel average. For example, FIG. 3A depicts an example of center-weighted metering AEC. Here, center-weighted metering AEC uses multiple concentric regions instead of a single global region to compute the luminance value, with higher weights in the central regions than the peripheral regions. FIG. 3B depicts an example of spot-metering AEC. Here, spot-metering AEC uses only the single most central region to compute the luminance value and ignores the rest of the image/frame.

According to further embodiments, more advanced non-CV AEC algorithms recognize that many scenes are not necessarily composed of "middle gray" in luminance. For example, a "snow" or a "beach" scene will typically have a higher level of brightness beyond the middle gray. Therefore, in those cases, alternative or additional exposure compensation may be applied instead of using the middle gray as the targeted exposure. Likewise, in a "sunset" scene, the exposure of the sensor needs to be reduced from middle gray so that the colors of the image are not washed out.

In photography, the measure of exposure is often expressed in Exposure Value, or EV, due to its ease of use. EV may be defined as:

$$EV = \log_2\left(\frac{F^2}{T}\right)$$

where F is the f-number (a measure of relative aperture commonly found in lenses), T is the exposure duration. For example, a relative aperture of f/1.0 exposed for 1 second yields an EV of 0, while f/5.6 exposed for 1/60 second yields an EV of 11. As a result, the smaller the EV, the more light is let into the camera, and vice versa. In practice, a photographer can target an exposure by fixing the EV appropriate for the scene and then adjust the associated aperture (in f-number) and exposure time to create the desired artistic effects such as the field of view (FOV) or motion blur and the lack of. Because the light sources of many visual scenes are predictable, the appropriate EV for various lighting conditions is also predictable. Camera sensitivity is often described with reference, for example, to the International Organization for Standardization (ISO) 12232:2006 standard for digital still images. For example, the lower the ISO number, the less sensitive a camera is to the light, while a higher ISO number reflects an increased sensitivity of the camera. For example, given a sensor sensitivity of ISO 100, a daylight snow scene might use an EV of 16, while an outdoor overcast scene might use an EV of 12. Conversely, if the light source is dim such as photographing the Milky Way in a night sky, then a long exposure may be needed for the camera, and an EV of −10 might be used.

Figure 4:
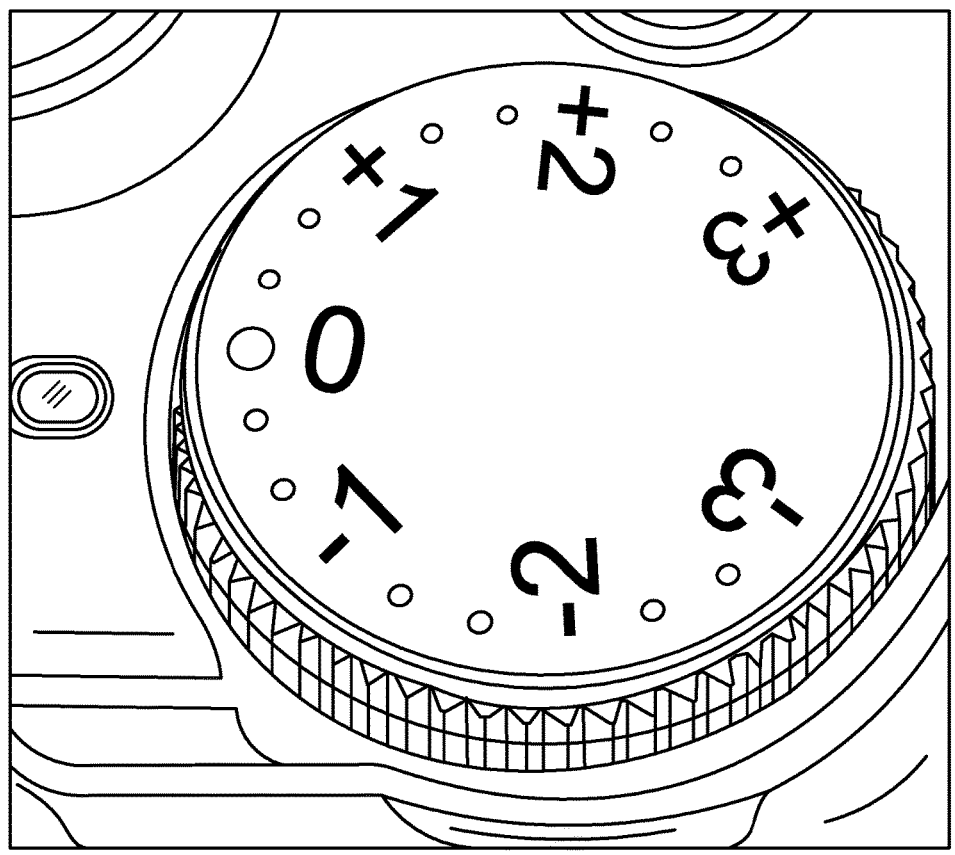
FIG. 4 shows an example of an exposure compensation dial on a camera with AEC.

Furthermore, EV offers a straightforward relationship in adjusting relative exposure. An increase of one EV corresponds to halving the amount of light, while the decrease of one EV the doubling of the amount of light. Interestingly, for exposure compensation nomenclature or the exposure compensation dial in a camera, "+1 EV" actually means to increase exposure which produces a smaller resultant EV, while "−1 EV" results in less exposure and a larger resultant EV in an image. FIG. 4 shows an example of an exposure compensation dial on a camera with AEC.

Figure 5A:
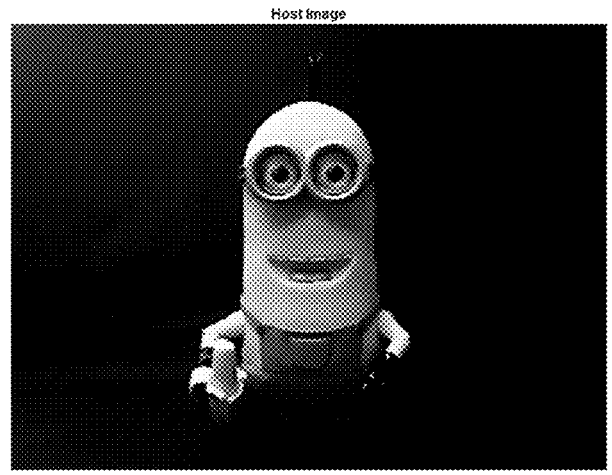
FIG. 5A illustrates an example of an image that has a large amount of black content in the background.
Figure 5B:
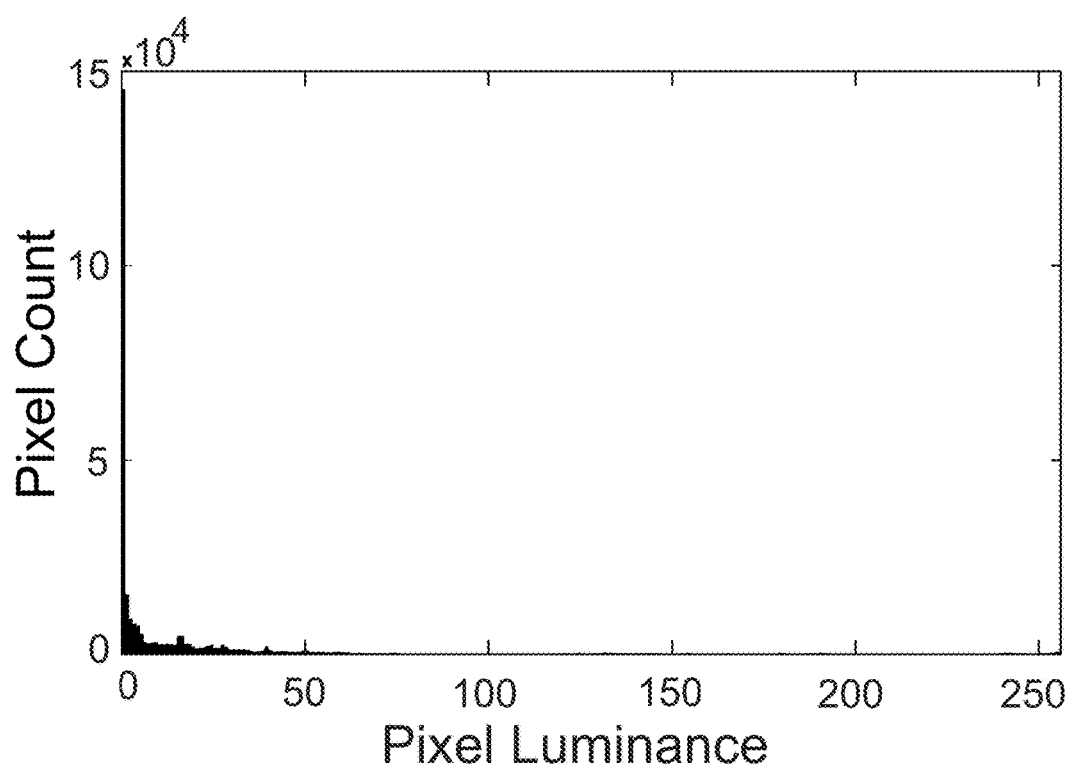
FIG. 5B is a luminance histogram associated with the black content-dominated image shown in FIG. 5A.

Two examples of non-CV AEC approaches are referred to here as Frame Average AEC and Filtered Frame Average AEC. A typical Frame Average AEC technique targets the middle gray as the average luminance for the image. For example, if the image sensor is monochromatic, then middle gray may be represented by the gray scale pixel value of 128 (out of 255). However, Frame Average AEC algorithm may not perform well when an image is back-lit (e.g. when the sun or a bright window is behind the subject) or when an image subject has a large amount of black content (e.g. when someone is wearing a black outfit). FIG. 5A illustrates an example of an image that has a large amount of black content in the background. FIG. 5B is a luminance histogram associated with the black content-dominated image shown in FIG. 5A.

Figure 6A:
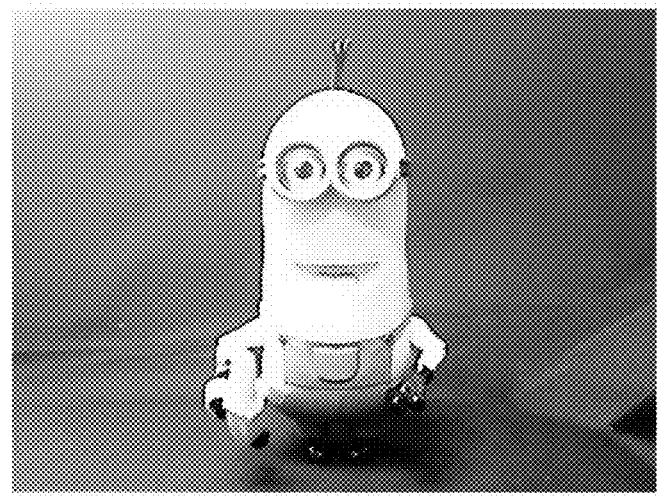
FIG. 6A illustrates the same black content-dominated image with Frame Average AEC applied, which leads to balanced pixel energy but over-saturation of the image.
Figure 6B:
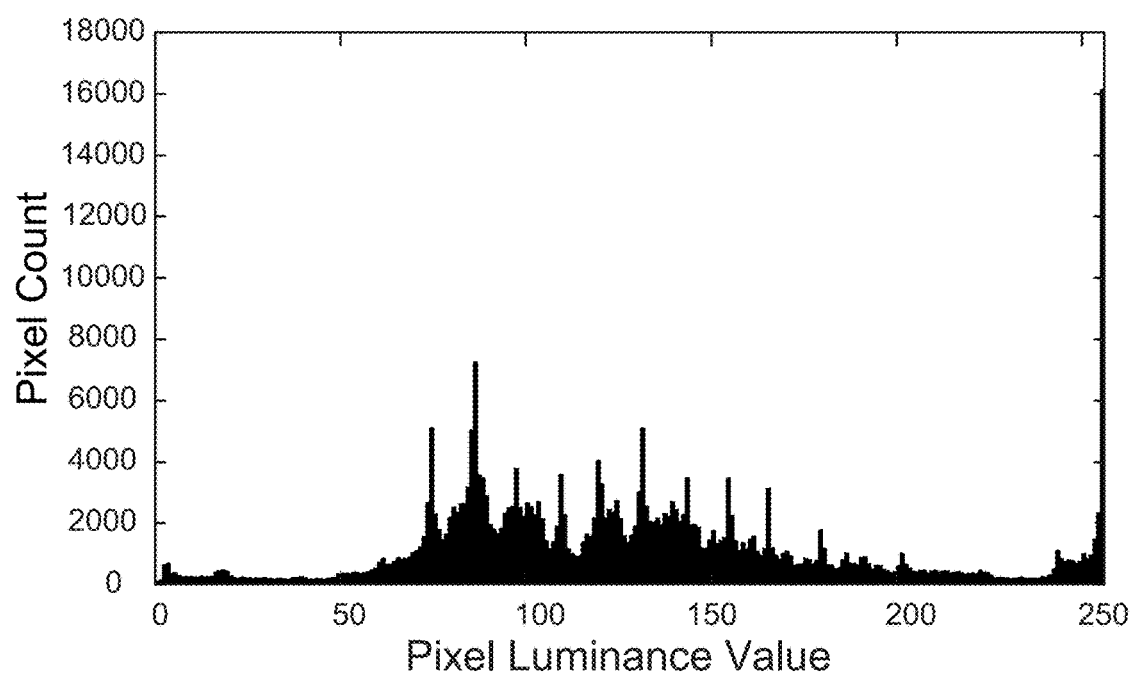
FIG. 6B is a luminance histogram associated with the Frame Average AEC corrected image shown in FIG. 6A.

The typical results from a Frame Average AEC under such situations are often either over-exposure or under-exposure. Specific image content can skew the resultant image into undesirable outcome—pixel energy is balanced but image is over-saturated. FIG. 6A illustrates the same black content-dominated image with Frame Average AEC applied, which leads to balanced pixel energy but over-saturation of the image. FIG. 6B is a luminance histogram associated with the Frame Average AEC corrected image shown in FIG. 6A.

To address these issues, some embodiments of the present disclosure adopt a Filtered Frame Average AEC algorithm for image sensors used for extracting CV features. FIG. 7A illustrates the same black content-dominated image with Filtered Frame Average AEC applied, which leads to balancing of only the "grey" pixel energy—only over certain bins that represent "grey" pixels. This achieves an image that is neither over-exposed nor under-exposed and is more visually appealing. FIG. 7B is a luminance histogram associated with the Filtered Frame Average AEC corrected image shown in FIG. 7A. In the luminance histograms of FIGS. 5B, 6B, and 7B, the x-axis represents an example luminance value from 0 to 256, and a y-axis of a pixel count ranging from 0 to 15·10⁴, 18000, 9000 respectively for each of FIGS. 5B, 6B, and 7B.

Figure 8:
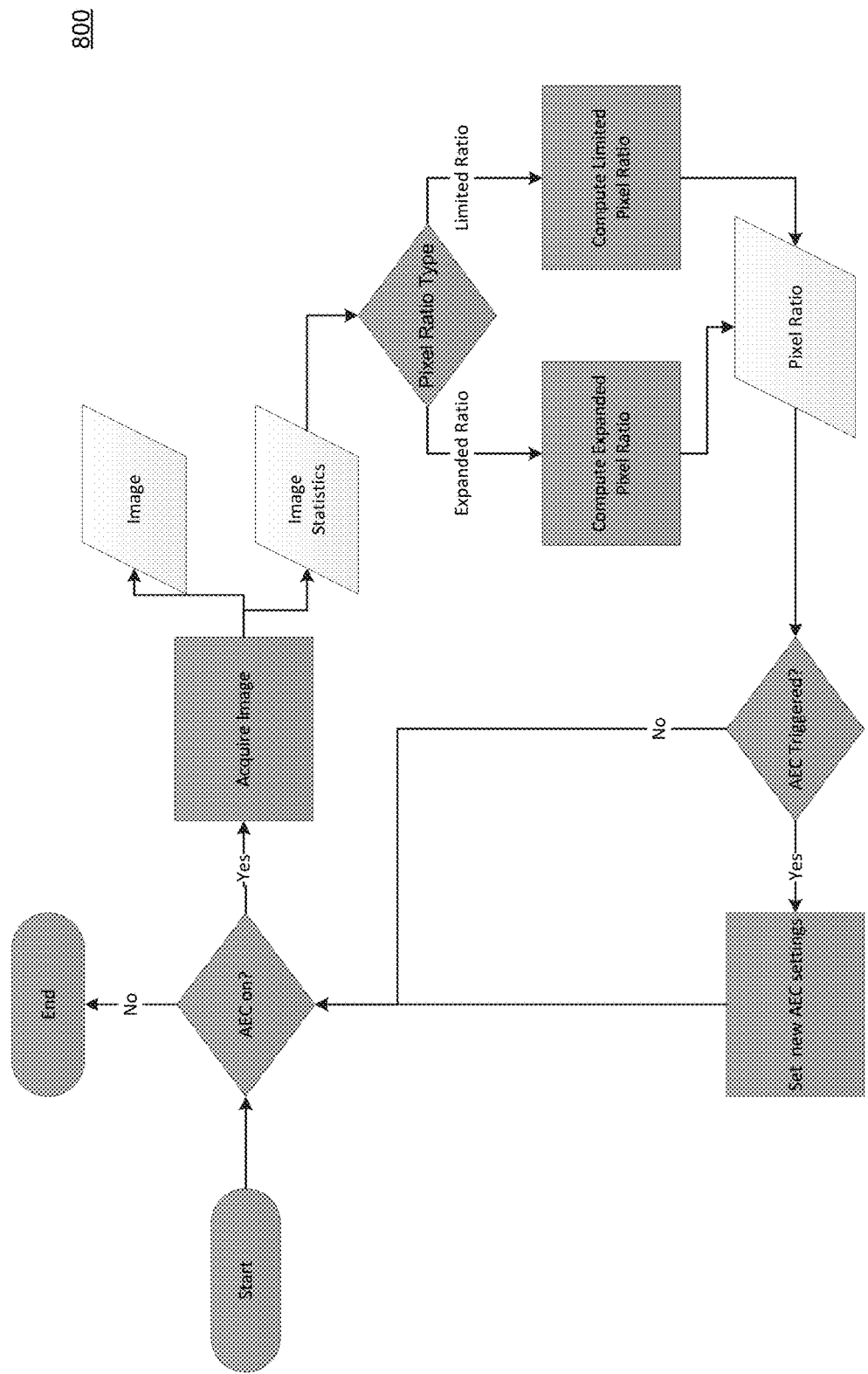
FIG. 8 is a flow chart illustrating an example of a non-CV AEC control loop.

FIG. 8 is a flow chart illustrating an example of a non-CV AEC control loop 800. Here, the non-CV AEC control loop implements a Filtered Frame Average AEC algorithm as described herein. The Filtered Frame Average ACE approach is explained in more detail below. In one embodiment, as an image is captured and an optional subsampling step is performed, pixels are binned into a number of categories or bins. In the example presented below, four categories are used: Blackpixels, Darkpixels, Bright pixels, and White pixels. The definition of the type of a pixel, x, may be described as follows:

x→Black Pixel, if $x<T_k$ x→Dark Pixel, if $T_k \leq x < T_d$ x→Bright Pixel, if $T_d \leq x < T_b$ x→White Pixel, if $x \geq T_b$ where $0 \leq T_k < T_d < T_b \leq$ Max Pixel Value Here, Black Pixel Threshold is denoted by, $T_k$; Dark Pixel Threshold is denoted by, $T_d$; and Bright Pixel Threshold is denoted by, $T_b$. Max Pixel Value is the maximum value for the luminance channel, such as 255 for an unsigned, 8-bit channel.

In this example, four counters, Black Pixel Count, denoted by $P_k$, Dark Pixel Count, denoted by $P_d$, Bright Pixel Count, denoted by $P_b$ or $P_{br}$, and White Pixel Count, denoted by $P_w$, are used to track the number of pixels belonging to the four pixel types of an image. When all the pixels in the AEC input image have been categorized, the distribution of the pixel values is computed in the form of the relative ratios between different types of pixels. Specifically two types of AEC statistics in the form of pixel ratios are tracked: (1) an Expanded Pixel Ratio and (2) a Limited Pixel Ratio. The Expanded Pixel Ratio takes into account more pixel categories, or pixel bins, than the Limited Pixel Ratio. One type of Expanded Pixel Ratio may be a Full Pixel Ratio, which takes into account all pixel categories and is used as an illustrative example below. The Full Pixel Ratio, $R_f$, divides the image into two bins: Black and Dark pixels in one, and Bright and White in the other. The LimitedPixel Ratio, $R_l$, on the other hand, excludes the White pixels and the Black pixels and only computes the pixel ratio based on the Dark and Bright pixels. Here, in order to avoid the potential division or multiplication by zero, both the numerator and the denominator of the Full Pixel Ratio and Limited Pixel Ratio start with the value of 1:

$$R_f = \frac{P_k + P_d + 1}{P_{br} + P_w + 1}$$

$$R_l = \frac{P_d + 1}{P_{br} + 1}$$

Alternatively in the log 2 domain:

$$Log(R_f) = Log(P_k + P_d + 1) - Log(P_{br} + P_w + 1)$$

$$Log(R_l) = Log(P_d + 1) - Log(P_{br} + 1)$$

In other embodiments, the Pixel Ratio can use the average value of the pixels instead of the count of the pixels for each pixel type. For example:

$$R_f = \frac{\frac{\sum_1^{P_k} V_{P_k}}{P_k} + \frac{\sum_1^{P_d} V_{P_d}}{P_d} + 1}{\frac{\sum_1^{P_{br}} V_{P_{br}}}{P_{br}} + \frac{\sum_1^{P_w} V_{P_w}}{P_w} + 1}$$

$$R_f = \frac{\frac{\sum_1^{P_k} V_{P_k}}{P_k} + \frac{\sum_1^{P_d} V_{P_d}}{P_d} + 1}{\frac{\sum_1^{P_{br}} V_{P_{br}}}{P_{br}} + \frac{\sum_1^{P_w} V_{P_w}}{P_w} + 1}$$

where V is the pixel value. Compared to the use of pixel count, the use of the average pixel value may produce a more accurate measurement of pixel ratios, though at a higher computational complexity.

In this example, the motivation for using Limited Pixel Ratio is that under back-lit lighting conditions, the light source in the image may appear as White pixels, thus it makes sense to exclude any pixels that are too bright so as not to skew the pixel ratio of the rest of the image. Likewise, Black pixels are to be excluded in the Limited Pixel Ratio so that any objects that are black will not be skewing the statistics of the overall image. As used herein, Full Pixel Ratio and Limited Pixel Ratio are two different AEC Statistics Types, and how to decide which ratio or statistics type to use is described below.

According to certain embodiments, the decision of which AEC Statistics Type to use can be based on the pixel count of the four pixel types. For example, if the sum of Black and White pixels outnumbers that of Dark and Bright pixels, then Full Pixel Ratio may be used, since it is more reliable, otherwise, Limited Pixel Ratio may be used.

$$R(P_k, P_d, P_{br}, P_w) = \begin{cases} R_f, & \text{if } P_k + P_w > P_d + P_{br}; \\ R_l, & \text{otherwise} \end{cases}$$

In order to avoid frequent switching between the two statistics type when the pixel counts are similar, an AEC inertia term can be used to guarantee a minimum number of consecutive captured frames yielding the new statistics type are met before it is adopted.

Figure 9A:
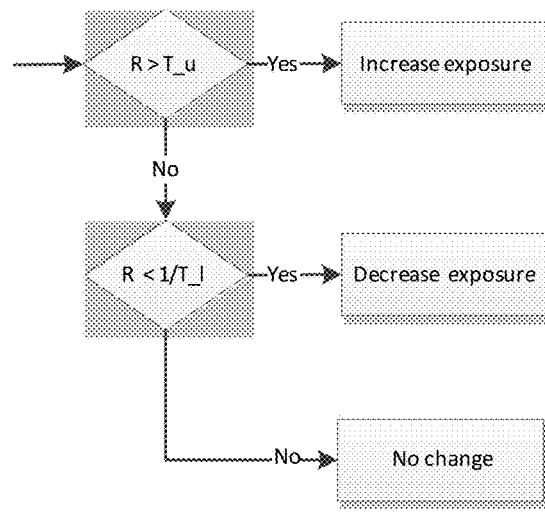
FIG. 9A is a flow chart 900 showing how the pixel ratio, R (whether $R_l$ or $R_f$), may be used to determine whether to increase or decrease exposure, e.g., through exposure time or gain, according to embodiments of the disclosure.
Figure 9B:
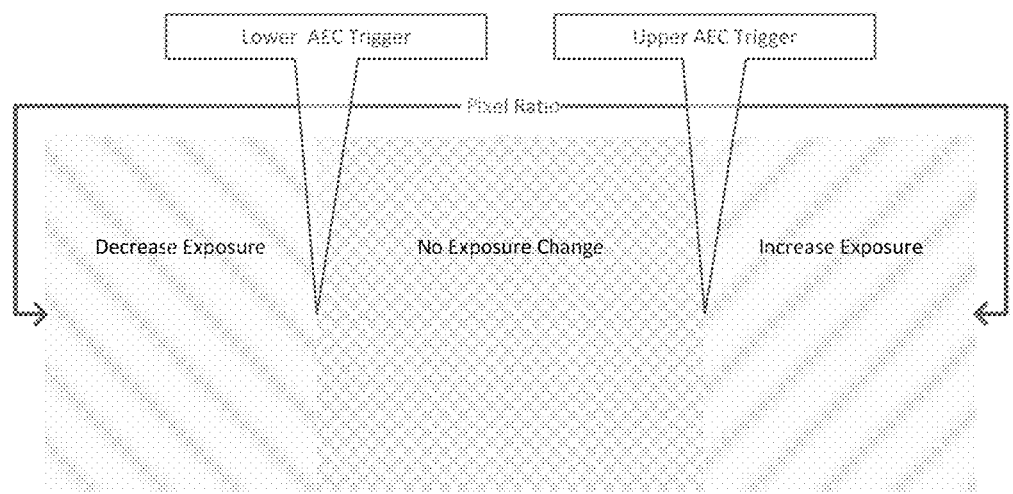
FIG. 9B illustrates a mechanism for exposure change in accordance with the flow chart shown in FIG. 9A.

FIG. 9A is a flow chart 900 showing how the pixel ratio, R (whether R1 or R1), may be used to determine whether to increase or decrease exposure, e.g., through exposure time or gain, according to embodiments of the disclosure. Once the AEC Statistics Type is determined, the resultant pixel ratio can be used to determine whether exposure adjustments in the next frame are to be made and by how much. In this example, if the pixel ratio, R, is greater than the Upper AEC Trigger threshold, Tu, then the exposure will be increased. On the other hand, if the pixel ratio, R, is less than 1/Lower AEC Trigger, 1/Tz, the exposure will be decreased. In one implementations, if the pixel ratio is in-between, then no change in the exposure time or gain is made. FIG. 9B illustrates a mechanism for exposure change in accordance with flow chart 1900 shown in FIG. 9A.

The magnitude of the exposure adjustment, Exposure Adjustment Factor, denoted as F, is a function of the selected pixel ratio, R. This factor is bounded by Maximum Adjustment Factor, $F_{max}$, on the upper end, and the inverse of Minimum Adjustment Factor, denoted by $1/F_{min}$, on the lower end.

$$F(R) = \begin{cases} F_{max}, & \text{if } R > F_{max}; \\ \frac{1}{F_{min}}, & \text{if } R < \frac{1}{F_{min}}; \\ R, & \text{otherwise} \end{cases}$$

For example, an exposure increase by a factor of 4 will quadruple the amount of light going into the sensor, which corresponds to an increase of 2 f-stops. Similarly, ¼ factor will decreases the incident light by 75%, which corresponds to a decrease of 2 f-stops in exposure. By setting $F_{max}$ and $F_{min}$, one can bound the percentage of exposure change, or f-stops, possible from one frame to the next.

According to certain embodiments, the dampening is further applied to the AEC process. Camera AEC algorithms are typically in the form of a delay feedback loop to allow adjustments to the analog gain or exposure time to take effect over time, for example, over multiple frames. As a result, if the magnitude of the changes is large, it can result in over-compensation due to the time delay, and exposure oscillations can occur. To dampen the potential oscillations, the exposure change can be put into effect as an infinite impulse response (IIR) system, where the gain change is the difference between the target exposure and the current exposure, and the change is being divided and spread out over multiple frames. The dampening operation uses a scaling factor to scale the gain at each frame. The scaling factor may be determined based on a desired number of frames over which the dampening operation distributes the effects of dampening. Here, e.g., in an IIR system, the desired number of frames may correspond to the minimum number of frames that it would take for the change in the gain (or other exposure control input) to be fully applied. An illustrative formula for an AEC gain algorithm employing dampening is as follows:

$$\acute{G}_{t=n+1} = G_{t=n} + (G_{t=n} * F(R_{t=n}) - G_{t=n})/I_{t=n}$$

or $$\acute{G}_{t=n+1} = G_{t=n}\left(1 + \frac{F(R_{t=n}) - 1}{I_{t=n}}\right)$$

or $$\acute{G}_{t=n+1} = G_{t=n} * M_{t=n}$$

where $G_{t=n}$ is the current gain value, $R_{t=n}$ is the current image's selected pixel ratio, $F_{t=n} \equiv F(R_{t=n})$ is the current exposure adjustment factor, $\acute{G}_{t=n+1}$ is the proposed new gain for the next frame, $I_{t=n}$ is the AEC Inertia term which serves to gradually incorporate the gain change over multiple frames. As can be seen, $G_{t=n} * F_{t=n}$ is the feedback term in the AEC gain change algorithm, such that if F=1, then the observed pixel ratio is balanced and there will be no need for any further gain change, such that $G_{t=n+1} = G_{t=n}$. Furthermore, if I=1 then the full amount of the gain change will be rolled into the immediate next frame, however, if I>1 then it will take at least I frames. For simplification the term, $$\left(1 + \frac{F_{t=n} - 1}{I_{t=n}}\right),$$

can be considered as the Gain Multiplier, $M_{t=n}$, such that the proposed gain is the product of the current gain and the gain multiplier. In order to control the AEC convergence time, T, the value of $I_{t=n}$ can be defined as a function of the frame rate, $F_{t=n}$, such that:

$$I_{t=n} \leq T F_{t=n}$$

For example, if it is desired for the exposure to converge within 0.5 s, then at 30 fps, then I should be set to no more than 15. If the frame rate now changes to 10 fps, then I should be adjusted to no more than 5.

For implementation efficiency in hardware, the above formulation can be written in the log 2 domain:

$$\acute{G}_{t=n+1} = G_{t=n}\left(1 + \frac{F_{t=n} - 1}{I_{t=n}}\right)$$

$$\acute{G}_{t=n+1} = G_{t=n}\left(\frac{I_{t=n} + F_{t=n} - 1}{I_{t=n}}\right)$$

$$\log(\acute{G}_{t=n+1}) = \log(G_{t=n}) + \log(I_{t=n} + F_{t=n} - 1) - \log(I_{t=n})$$

Figure 10:
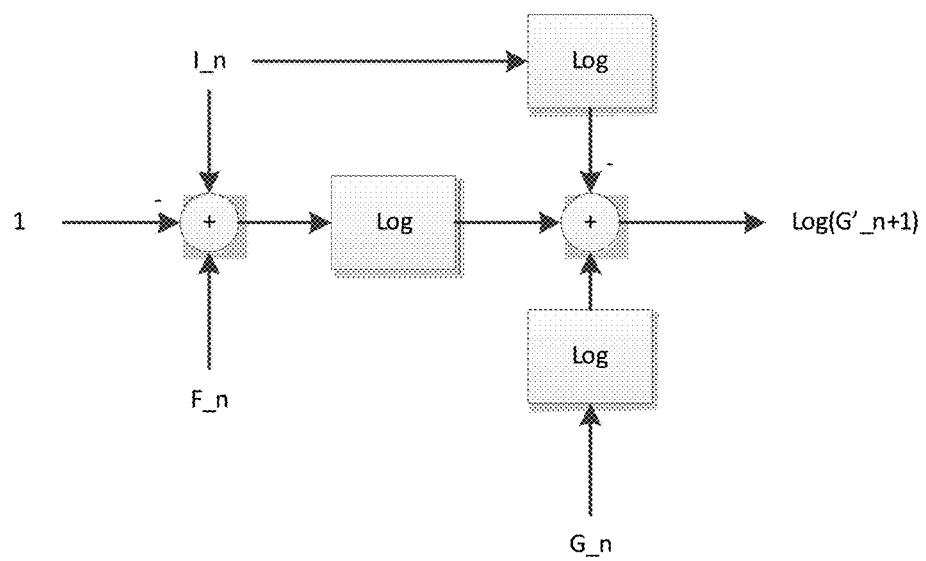
FIG. 10 illustrates a data flow for the computation of the gain for the next image frame, in logarithmic form.

FIG. 10 illustrates a data flow 1000 for the computation of the gain $\log(\acute{G}_{t=n+1})$ for the next image frame, in logarithmic form.

According to certain embodiments, depending on the value of proposed new gain, $G_{t=n+1}$, and the value of the current analog gain value, $G_{t=n}$, and current exposure time, $E_{t=n}$, the exposure time and/or analog gain for the next frame may be adjusted. Specifically, all vision sensors have a specific dynamic range in its analog gain, bounded by Min Analog Gain, denoted by $G_{min}$, and Max Analog Gain, denoted by $G_{max}$. Likewise, for exposure time, there is a Min Exposure Time, $E_{min}$, and a Max Exposure Time, $E_{max}$, that bound its dynamic range. And there is an inter-dependency between the analog gain value and the exposure time value such that changing one will change the other, if everything else stays the same. As a result, the computation of the new analog gain, $G_{t=n+1}$, and new exposure time, $E_{t=n+1}$, for the next frame can be divided into the following 5 scenarios, for example:

1. $G_{min} \leq \acute{G}_{t=n+1} \leq G_{max} \rightarrow G_{t=n+1} = \acute{G}_{t=n+1}$
   If the new gain falls within the range of maximum and minimum analog gain, then only the analog gain is changed but the exposure time stays the same. In the log 2 domain:

$$\log(G_{t=n+1}) = \log(\acute{G}_{t=n+1})$$

2. $\acute{G}_{t=n+1} > G_{max}$ and $E_{t=n} < E_{max} \rightarrow E_{t=n+1} = M_{t=n} * E_{t=n}$
   If the new gain is greater than the maximum analog gain but the maximum exposure time has not been reached, then change the exposure time. In the log 2 domain:

$$\log(E_{t=n+1}) = \log(M_{t=n}) + \log(E_{t=n})$$

3. $\acute{G}_{t=n+1} < G_{min}$ and $E_{t=n} > E_{min} \rightarrow E_{t=n+1} = M_{t=n} * E_{t=n}$
   If the new gain is smaller than the minimum analog gain but the minimum exposure time has not been reached, then change the exposure time. In the log 2 domain:

$$\log(E_{t=n+1}) = \log(M_{t=n}) + \log(E_{t=n})$$

4. $\acute{G}_{t=n+1} > G_{max}$ and $E_{t=n} = E_{max} \to G_{t=n+1} = G_{max}$ If the new gain is greater than the maximum analog gain but the maximum exposure time has been reached, then set the new gain to the maximum analog gain. In the log 2 domain:

$$\log(G_{t=n+1}) = \log(G_{max})$$

5. $\acute{G}_{t=n+1} < G_{min}$ and $E_{t=n} = E_{min} \to G_{t=n+1} = G_{min}$ If the new gain is smaller than the minimum analog gain but the minimum exposure time has been reached, then set the new gain to the minimum analog gain. In the log 2 domain:

$$\log(G_{t=n+1}) = \log(G_{min})$$

Figure 11:
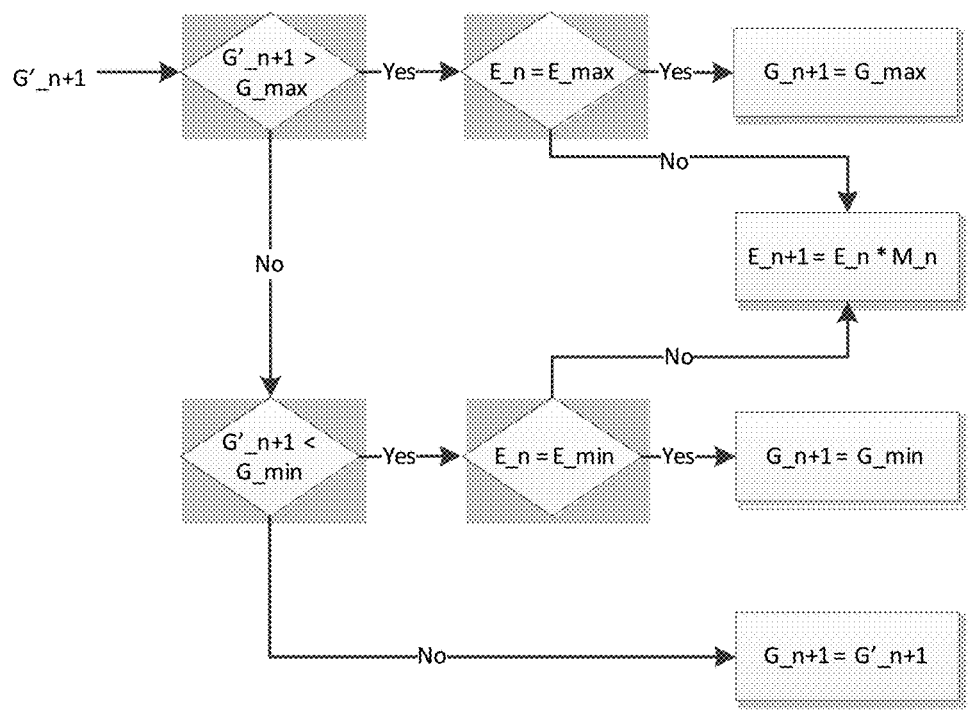
FIG. 11 is a flow chart showing the control flow of the AEC analog gain and exposure time adjustments from one frame to the next, according to certain embodiments.

FIG. 11 is a flow chart 1100 showing the control flow of the AEC analog gain and exposure time adjustments from one frame to the next, according to certain embodiments as described in the five scenarios above.

According to further embodiments, in the case where the AEC Statistics Type changes from Full Pixel Ratio to Limited Pixel Ratio, a transition in the respective gain and exposure values may help ensure a smooth transition. For example, the simple average of the gain and exposure time between the can be used for the transitional frame:

$$G_{t=n+1} = (G_{t=n+1} + G_{t=n})/2$$

$$E_{t=n+1} = (E_{t=n+1} + E_{t=n})/2$$

Additionally, under specific lighting situations, the user might desire to set a bias in the brightness of the image frame by adding an exposure compensation. This can be achieved by simply setting the appropriate value of the Dark Pixel Threshold, $T_d$, according to embodiments of the disclosure. Specifically, if no exposure compensation is desired, then the relationship between the three pixel thresholds may be as follows:

$$T_d = (T_k + T_b)/2$$

such that the value of $T_d - T_k$ is the same as that of $T_b - T_d$. As a result, in a uniformly distributed pixel frame, the amount of pixels being counted as Bright Pixels may be the same as that of Dark Pixels, and the resultant Pixel Ratio may be 1. In the general case, the amount of Exposure Compensation, as measured by Exposure Value, EV, can be set using the following formula:

$$2^{EV} = \frac{T_d - T_k}{T_b - T_d}$$

or $$T_d = \frac{2^{EV} * T_b + T_k}{1 + 2^{EV}}$$

For example, say $T_k=5$; $T_b=205$, and we want to underexpose the frame by 1 f-stop such that EV=-1, then we can compute $T_d$ as follow:

$$T_d = \frac{2^{-1} * 205 + 5}{1 + 2^{-1}}$$

$$T_d \cong 72$$

Computer Vision Based Automatic Exposure Control (CV AEC)

Alternatively or additionally, various embodiments of the disclosure implement computer vision based automatic exposure control (CV AEC). CV AEC refers to techniques that accomplish automatic exposure control by taking into account effects of exposure control on computer vision (CV) operations. Here, the purpose of sensing an image may not necessarily be to reconstruct or faithfully transmit an image. Rather, the purpose may be to transform an input image such that reliable, high quality computer vision (CV) features can be extracted. In other words, instead of emphasizing on image quality based on human aesthetics as in conventional cameras, the system can focus on the quality or quantity of the extracted CV feature to be processed using the image. Many such CV features are primarily extracting relative pixel gradients. For example, local binary pattern (LBP) and multi-block LBP (MB-LBP) are local gradient extractions relative to the center pixel. Center symmetric LBP (CS-LBP) is local gradient extractions relative to spatially opposing pixels. Patch symmetric LBP (PS-LBP) and its variants are local gradient extractions relative to a collection of local pixels. Haar-like features consider adjacent rectangular regions at a specific location in a detection window, sums up the pixel intensities in each region and calculates the difference between these sums. LBP, MB-LBP, CS-LBP, PS-LBP, Harr-like features, etc., are just some examples of CV features that may be used in computer-based image analysis/detection techniques. Here, so long as the relative value of the extracted pixels within the CV feature is preserved, then it may be sufficient to produce consistent CV features. As a result, application of global image normalization or digital gain may not be necessary for various types of CV feature extraction, since such application does not necessarily impact the relative values among pixels.

Figure 12A:
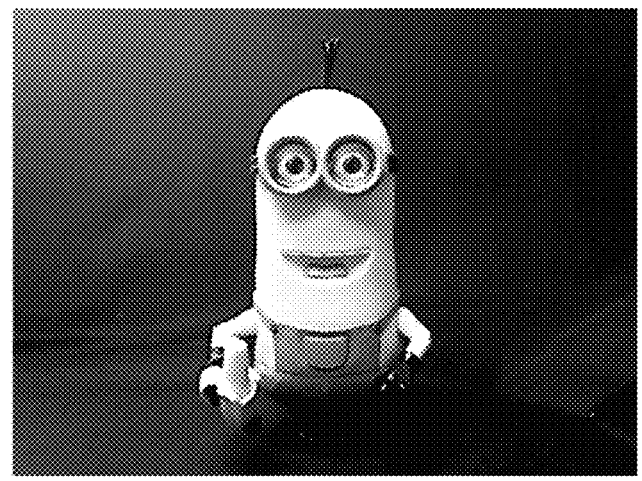
FIG. 12A shows an image on which computer vision based automatic exposure control (CV AEC) may be performed.
Figure 12B:
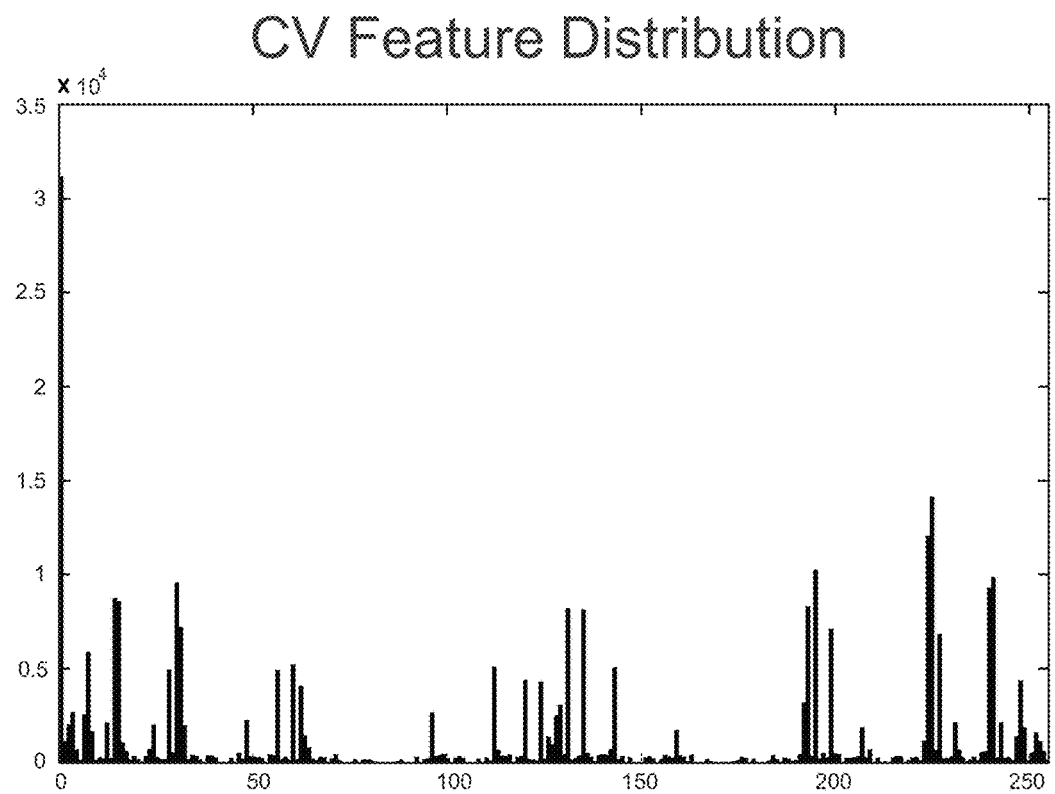
FIG. 12B illustrates the distribution of CV features computed from the image shown in FIG. 12A.

FIG. 12A shows an image on which computer vision based automatic exposure control (CV AEC) may be performed. FIG. 12B illustrates the distribution of CV features computed from the image shown in FIG. 12A. Unlike pixel luminance distribution (e.g., the histograms shown in FIGS. 5B, 6B, and 7B), CV feature distribution is spiky. Adjusting gain/exposure does not necessarily result in a monolithic shift in CV feature distribution, as in non CV-AEC. Furthermore, depending on the CV task at hand, only a subset of all possible CV features are relevant to a particular classifier, e.g., a machine learning (ML) classifier that takes CV features as input and is trained to detect the presence of a given target object, in the illustrated example, a Minion character. In the histograms showing the distribution of CV features of FIG. 12B, and the subsequent FIGS. 13B, 14B, 15B, and 16C, the x-axis represents a given LBP computer vision feature which corresponds to an 8-bit number, and hence the different computer vision features range from 0 (for LBP feature 00000000) to 256 (for LBP feature 11111111), and a y-axis of a CV feature count ranging from 0 to $3.5 \cdot 10^4$, $3.5 \cdot 10^4$, $3.5 \cdot 10^4$, $9 \cdot 10^4$, and $3.5 \cdot 10^4$ respectively for each of FIGS. 12B, 13B, 14B, 15B, and 16C.

Figure 13A:
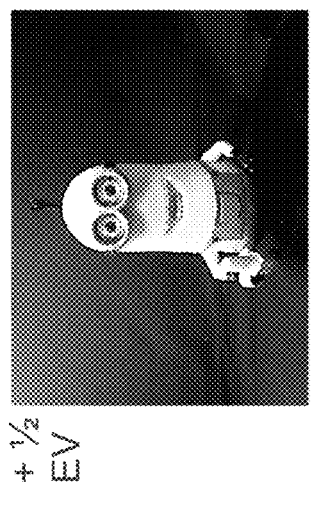
FIG. 13A shows an image having +½ exposure value (EV) of exposure control applied.
Figure 13B:
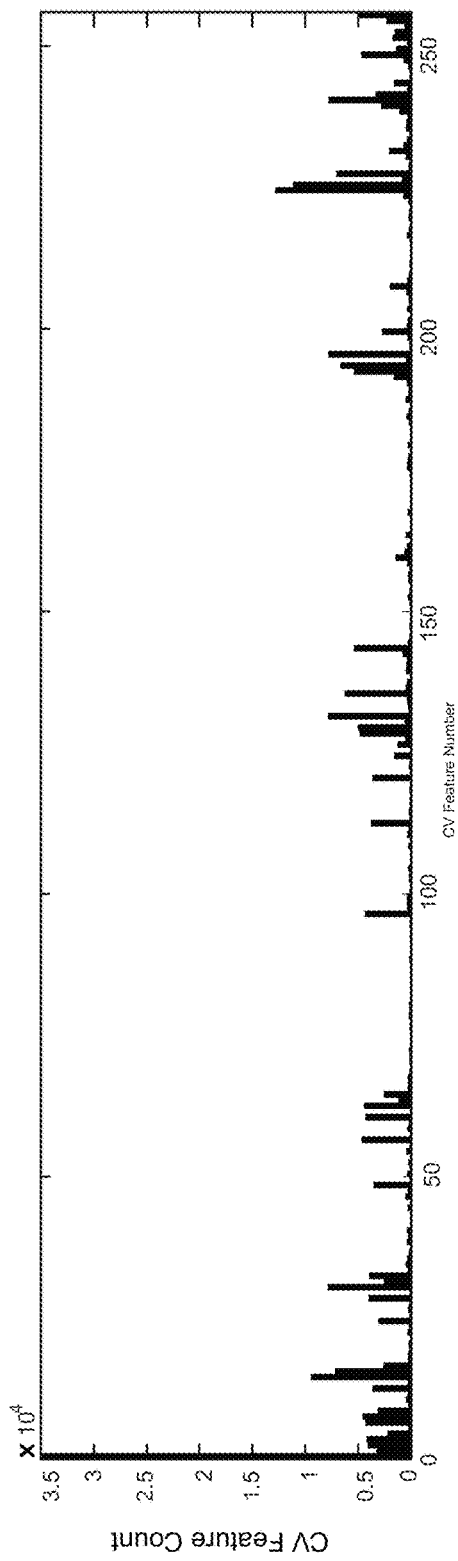
FIG. 13B illustrates the distribution of CV features computed from the +½ EV image of FIG. 13A.
Figure 14A:
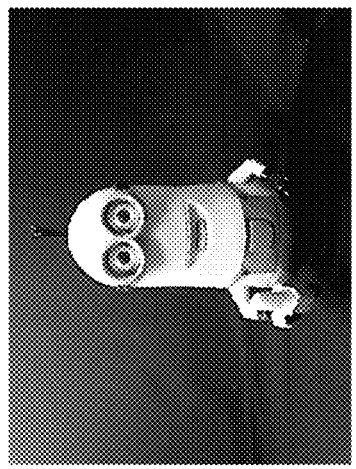
FIG. 14A shows the same image having no exposure control applied, i.e., a nominal 0 EV applied.
Figure 14B:
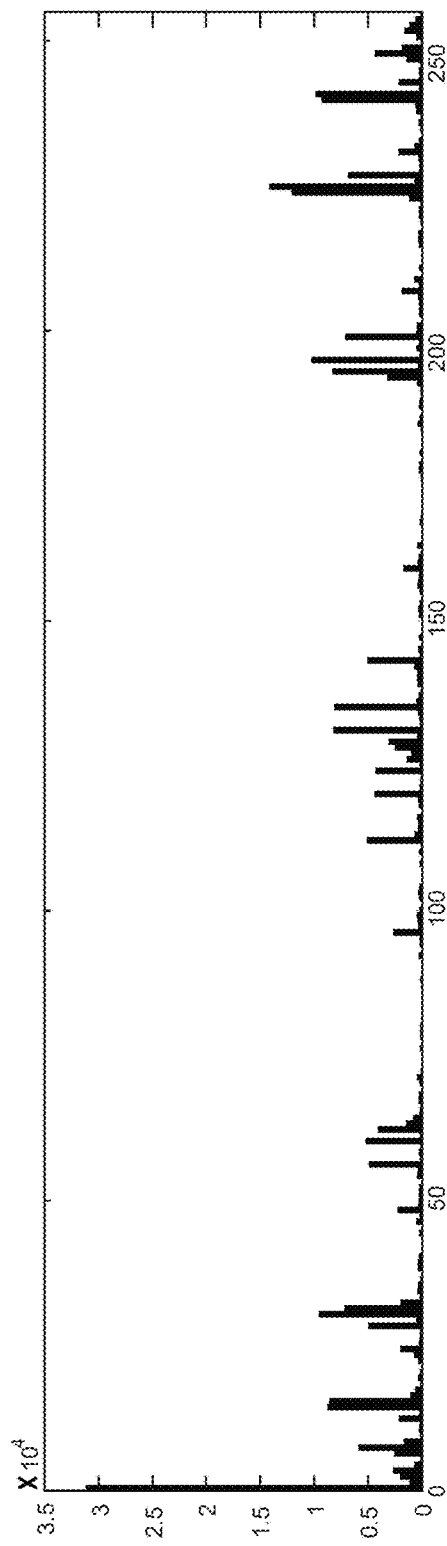
FIG. 14B illustrates the distribution of CV features computed from the 0 EV image of FIG. 14A.
Figure 15A:
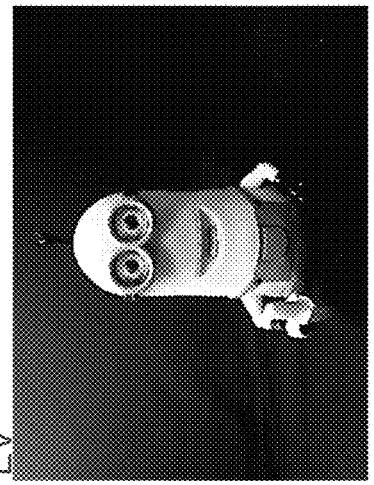
FIG. 15A shows an image having −½ EV of exposure control applied.
Figure 15B:
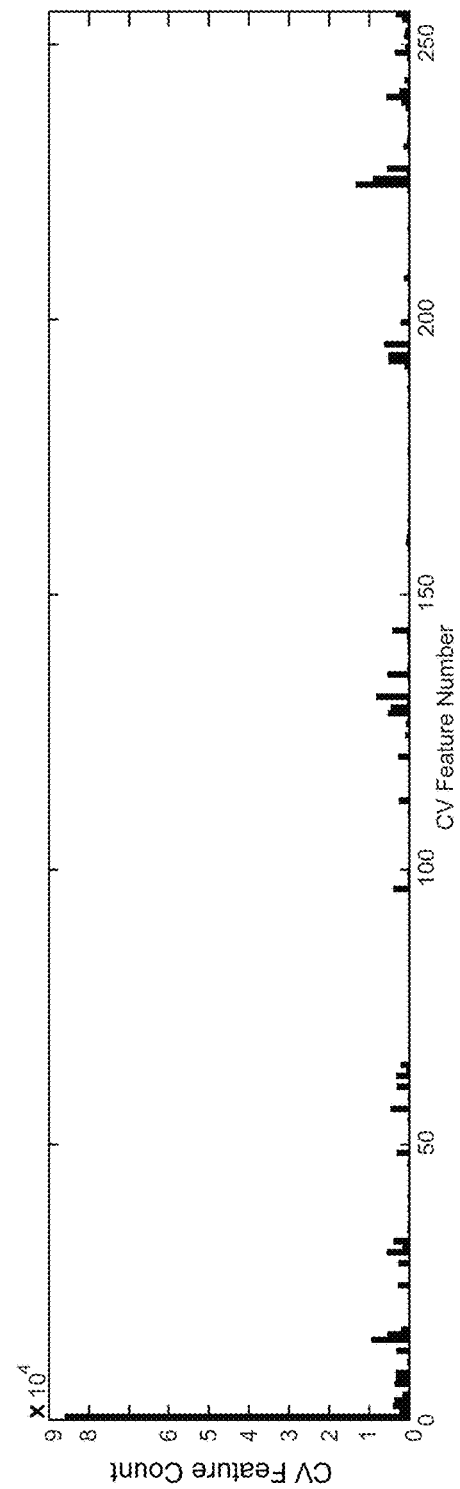
FIG. 15B illustrates the distribution of CV features computed from the −½ EV image of FIG. 15A.

According to various embodiments, CV AEC adjusts exposure control parameters, such as gain, exposure time, aperture, etc., to maximize a targeted set of CV feature extraction. FIG. 13A shows an image having +½ EV of exposure adjustment applied. FIG. 13B illustrates the distribution of CV features computed from the +½ EV image of FIG. 13A. FIG. 14A shows the same image having no exposure adjustment applied, i.e., a nominal 0 EV applied. FIG. 14B illustrates the distribution of CV features computed from the 0 EV image of FIG. 14A. FIG. 15A shows an image having -½ EV of exposure adjustment applied. FIG. 15B illustrates the distribution of CV features computed from the -½ EV image of FIG. 15A. As can be seen from these figures, different levels of exposure control may produce different distributions of CV features. Here, the +½ EV exposure control produces most CV features that are relevant to detection of the Minion character. That is, out of the three exposure adjustment levels, +½ EV produces the most abundant CV features from within the subset of CV features relevant to the Minion classifier. In response, the CV AEC system chooses the +½ EV as the exposure control level for a subsequent image to be acquired. The process may be repeatedly performed to settle on an optimal exposure control level.

Figure 16A:
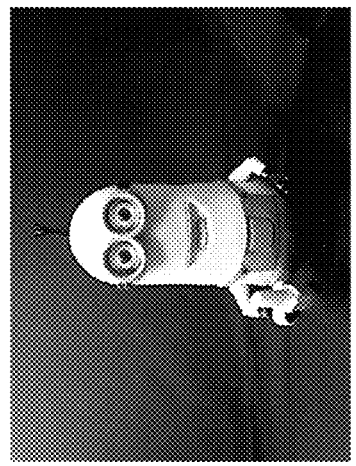
FIG. 16A shows an image on which computer vision based automatic exposure control (CV AEC) may be performed.
Figure 16B:
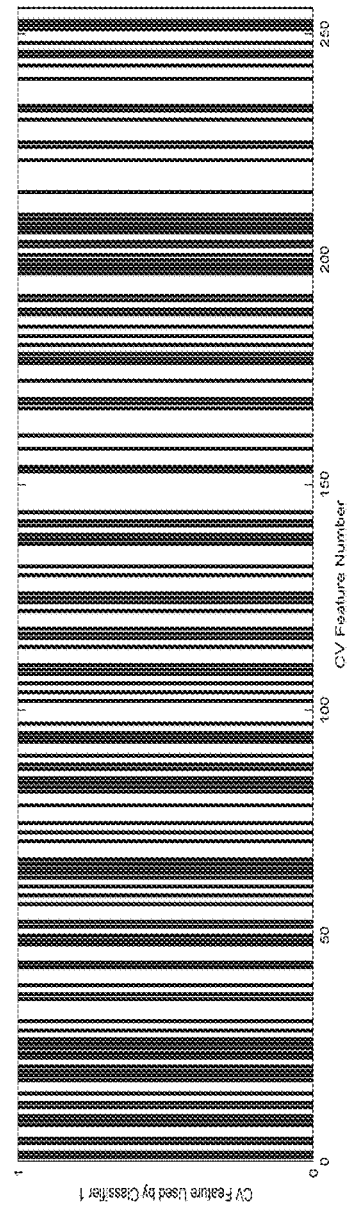
FIG. 16B shows a mask comprised of a binary value (i.e., "1" or "0") for each possible CV feature that may be computed from a particular CV operation or set of operations based on the image of FIG. 16A.

FIG. 16A shows an image on which computer vision based automatic exposure control (CV AEC) may be performed. FIG. 16B shows a mask comprised of a binary value (i.e., "1" or "0") for each possible CV feature that may be generated from a particular CV operation or set of operations based on the image of FIG. 16A. In the illustrated implementation of a binary mask, the mask identifies only those CV features that are relevant—in the illustrated example, that are relevant to a particular trained classifier for detecting a given object, in the illustrated example, the classifier trained to detect the Minion character mentioned above. Within the mask, each position marked with a non-zero value (i.e., "1") corresponds to a CV feature that is relevant to the particular classifier. Each position marked with a zero value (i.e., "0") corresponds to a CV feature that is not relevant to the particular classifier. Thus, the mask identifies the subset of the set of possible CV features, where the set of possible CV features represent the CV features capable of being generated by the CV operation (or set of operations), that are relevant to the classifier. According to certain embodiments, the mask may be generated as an output of the training process associated with training the classifier for detection of a particular object. According to other embodiments, the mask may be generated without training a classifier. For example, it may be recognized that particular types of CV features are associated with certain image feature and are therefore worth emphasizing. Just as an example, where the CV operation comprises a local binary pattern (LBP), one type of CV feature that may be emphasized is one that contains only one pair of transitions in the binary pattern. Such an occurrence may be referred to as "transition-LBPn" where n=1 (e.g., " . . . 00100 . . . " or " . . . 11011 . . . "). Such CV features may be emphasized by setting the corresponding positions to a non-zero value (i.e., "1") within the mask and setting other position to a zero value (i.e., "0") within the mask. Qualitatively, LBP patterns containing a higher number of transitions, e.g., "transition-LPBn" where n is a larger number, tend to contain texture information. Accordingly, if texture details are not necessary for the objective of the system, e.g., detection of a particular object or type of object in the scene, then such CV features may be de-emphasized by setting the corresponding positions to a zero value (i.e., "0") within the mask and setting other positions to a non-zero value (i.e., "1").

While the mask shown in FIG. 16B comprises binary values, in other embodiments, the mask may comprise other types of values. In one embodiment, the mask comprises real values that represent different weights to be applied. That is, instead of dividing CV features into either "relevant" or "not relevant" as in the case of the binary mask, a weighted mask having real values may assign a different relevance weight to each of the possible CV features resulting from a CV operation. Each relevant value is represented by a real number within the mask. The real numbers may be implemented in various ways, for example, as integers within a range (e.g., −10 to +10, 0 to 15, etc.). In another example, the real numbers may be implemented as decimal numbers or fractions. In such an implementation, a measure of abundance of relevant CV features could represent a score, such as a weighted sum, indicating, for example, how many relevant or important CV features a set of CV features extracted from an image includes. Such a score can allow the comparison of two or more images to determine which of the two images has a higher score. In addition to a weighted sum, different kinds of scores can additionally or alternatively indicate whether a set of CV features extracted from an image includes a diversity of relevant or important CV features as compared to a multitude of the same single relevant or important CV feature or small group of relevant or important CV features. In some implementations, multiple scores can be computed that reflect different aspects of a measure of abundance of relevant CV features, and the multiple scores can be combined to prefer one image (or set of exposure parameters) over others.

Figure 16C:
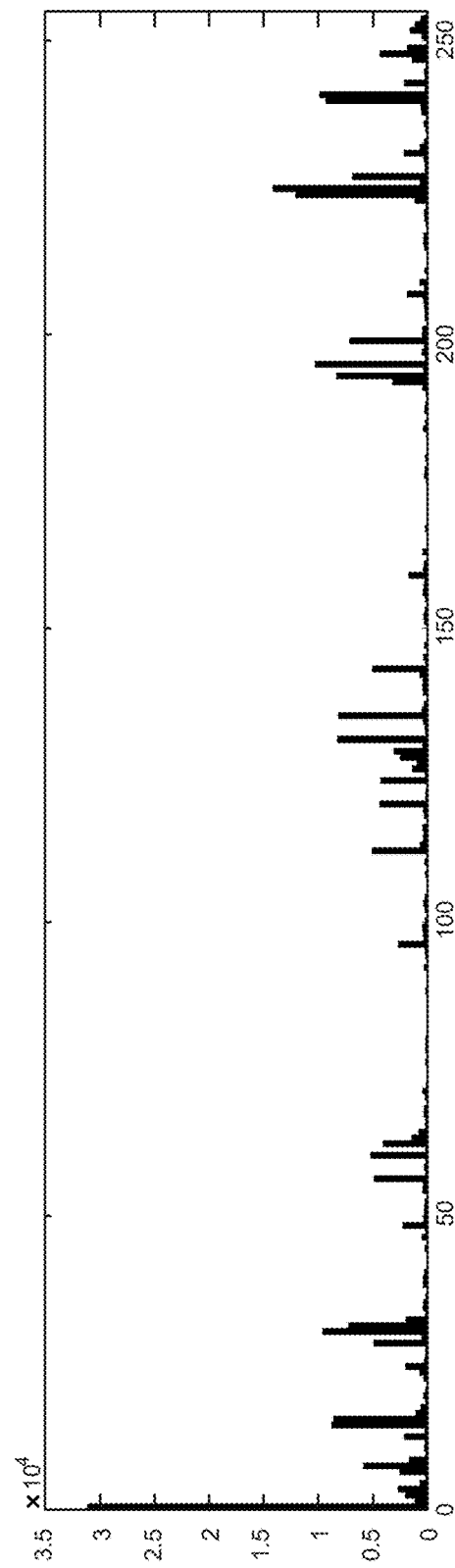
FIG. 16C illustrates the distribution of CV features computed from the image shown in FIG. 16A.

FIG. 16C illustrates the distribution of CV features computed from the image shown in FIG. 16A. The X-axes of FIGS. 16B and 16C align, i.e., they have a one-to-one correspondence. The mask shown in FIG. 16B, once applied to the CV distribution, identifies which CV features shown in FIG. 1 6C would be relevant to this particular classifier. Using the mask, the CV AEC technique may select a particular exposure control level (e.g., +½ EV) out of a plurality of possible exposure control levels (e.g., +½ EV, 0 EV, −½ EV), that maximizes the abundance of CV features relevant to detection of a particular object by a classifier. The abundance of relevant CV features generated by the image exposed using an exposure control level that increases the reliability of subsequent classifier decision compared to a different exposure control level. As discussed previously, the technique may be repeatedly performed, such as in a loop, until an optimal level of exposure is reached.

Thus, using the mask, a measure of abundance of relevant CV features may be obtained, among the set of CV features extracted from each digital image. For example, in a case of a binary mask, the measure of abundance may be a basic count of number of CV features (e.g., FIG. 16B) generated from the digital image (e.g., FIG. 16A) that align with the non-zero (e.g., "1") values of the mask (e.g., FIG. 16C). In another example, in a case of a weighted mask, the measure of abundance may be a weighted count or score resulting from multiplying each CV feature generated from the digital image with the corresponding weight (e.g., real number) from the weighted mask, then adding all the multiplication results together. Thus, one manner of generating the measure of abundance, such as the count, weighted count, or score, is taking the dot product of the mask with the CV features generated from the digital image.

Note that the CV AEC technique, including use of the mask, iteration within one or more loops, etc., can be performed prior to operation of the classifier. In other words, CV AEC can be performed to adjust exposure for capturing an image, in a manner that maximizes the abundance of CV features relevant to a classifier, prior to actually providing the CV features to the classifier to classify the image.

Figure 17:
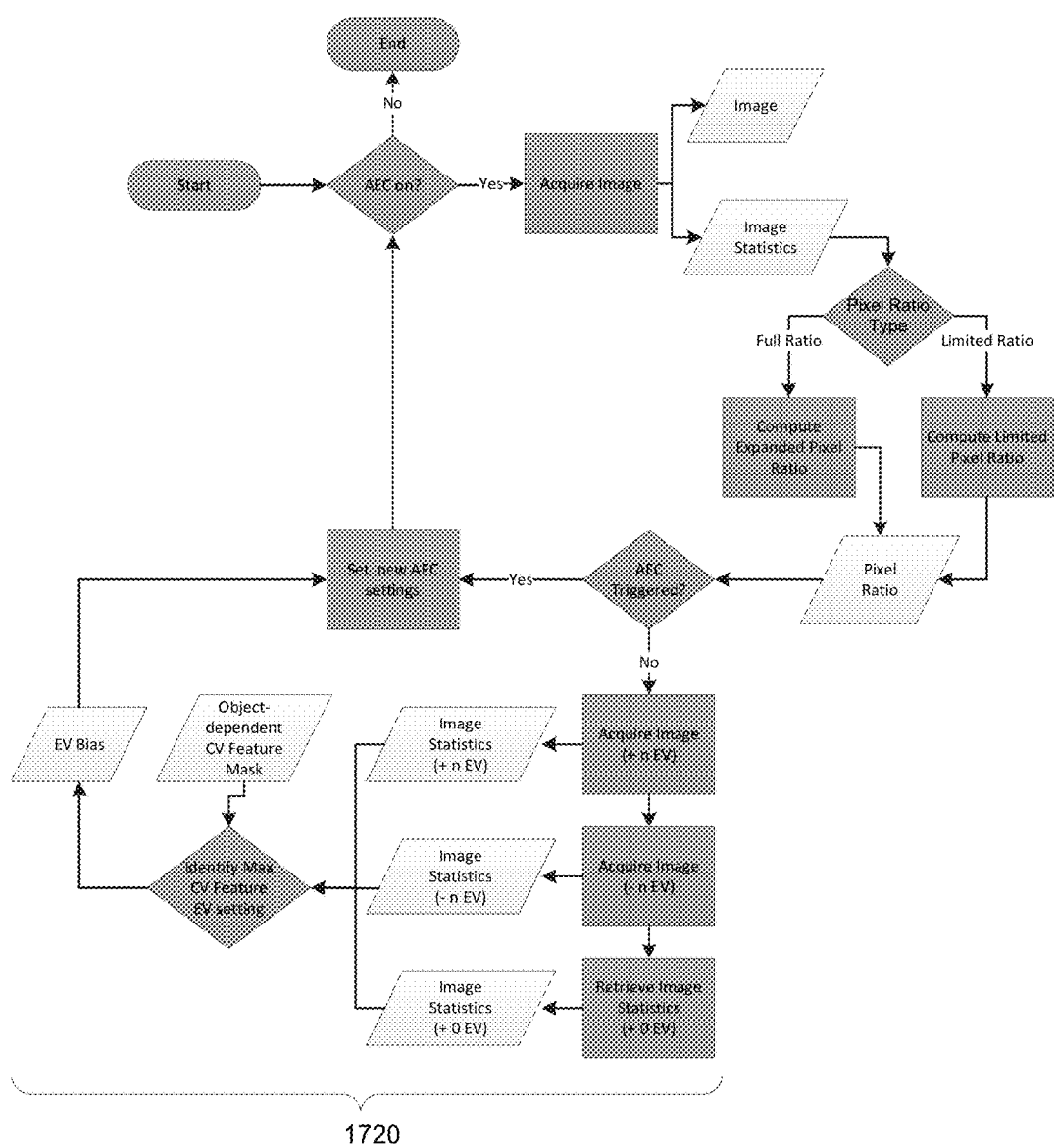
FIG. 17 is a flow chart illustrating an example of a combined AEC control loop comprising (1) a non-CV AEC control loop and (2) a CV AEC control loop.

FIG. 17 is a flow chart illustrating an example of a combined AEC control loop 1700 comprising (1) a non-CV AEC control loop 1710 and (2) a CV AEC control loop 1720. According to various embodiments of the disclosure, a combined technique involves first running the non-CV AEC control loop to settle on a good exposure setting with respect to visual quality (based on pixel brightness distribution), then running the CV AEC loop to refine the exposure settings to maximize the count of relevant CV features (using a CV feature relevance mask) for detecting a particular object by a classifier.

For example, in the non-CV AEC control loop 1710, the process iterates in the loop in a manner similar to that described with respect to FIG. 8, until a good exposure setting with respect to visual quality is reached. The exit condition is reflected by the "AEC Triggered?" block. As discussed previously, the pixel ratio (e.g., either the Limited Pixel Ratio or the Full Pixel Ratio) is evaluated against a threshold, e.g., the AEC Trigger. If AEC is triggered ("Yes"), it means that the non-CV AEC control loop 1710 has not converged, so the loop is iterated. If AEC is not triggered ("No"), it means that the non-CV AEC control loop 1710 has converged. This is an example of reaching a non-CV AEC target condition. At this point, the CV AEC control loop 1720 may be initiated. The CV AEC control loop 1720 acquires three images at different exposure levels, for example+½ EV, 0 EV, and −½ EV. In each case, at least one CV operation(s) may be performed on the acquired image to generate a set of CV features extracted from the acquired image, wherein the generated set of CV features are from the set of possible CV features. The mask for determining a measure of abundance of relevant CV features extracted from a given image (taken using a given exposure level), where, in some examples, the relevant CV features may be relevant for a particular classifier (e.g., for detecting the Minion character) may be applied. The exposure level that results in the most abundant CV features relevant to the classifier may be chosen as the "winning" exposure level, out of the three levels+½ EV, 0 EV, and −½ EV. The "winning" exposure level may be set as the new nominal exposure level in the next iteration of the loop. For example, if in iteration N, the "winning" exposure level is +½ EV, then that exposure level is set as the nominal exposure level (i.e., 0 EV) in the next iteration of the CV AEC control loop 1720. The CV AEC control loop 1720 may iterate until it settles and an optimal exposure level is reached with respect to maximizing relevant CV features for the classifier.

Figure 18A:
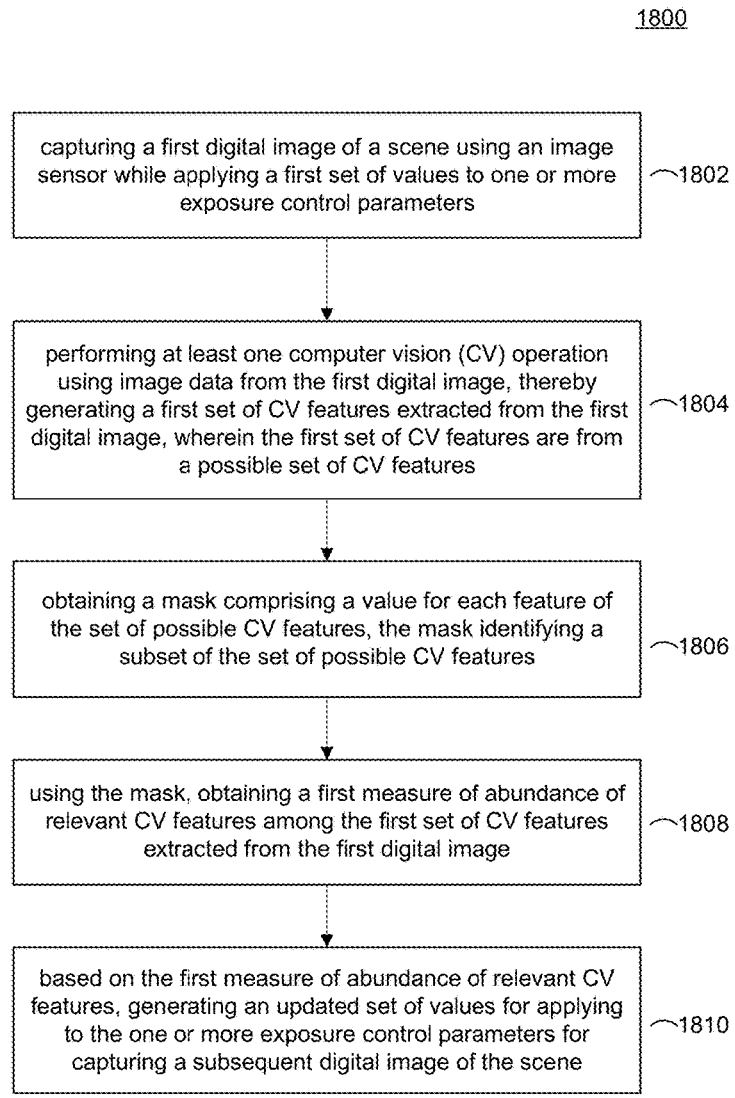
FIG. 18A is a flow chart 1800 showing illustrative steps in a process for performing CV AEC according to at least one embodiment of the disclosure.

FIG. 18A is a flow chart 1800 showing illustrative steps in a process for performing CV AEC according to at least one embodiment of the disclosure. For example, in a step 1802, a first digital image of a scene is captured using an image sensor while applying a first set of values to one or more exposure control parameters. Step 1802 may be carried out, for example, by using camera(s) 1920, which is described later in connection with FIG. 19. In a step 1804, at least one computer vision (CV) operation is performed using image data from the first digital image, thereby generating a first set of CV features extracted from the first digital image, wherein the first set of CV features are from a set of possible CV features. In a step 1806, a mask is obtained comprising a value for each feature of the set of possible CV features. One example of such a mask is described with reference to FIG. 16B. In a step 1808, using the mask, a first measure of abundance is obtained of relevant CV features among the first set of CV features extracted from the first digital image. Examples of measures of abundance are described with reference to FIGS. 16A, 16B, and 16C. In a step 1810, based on the first measure of abundance of relevant CV features, an updated set of values is generated for applying to the one or more exposure control parameters for capturing a subsequent digital image of the scene. Steps 1804 through 1810 may be carried out, for example by using processor(s) 1904 or other circuitry, which are described later in connection with FIG. 19.

According to one embodiment, obtaining the first measure of abundance of relevant CV features comprises (a) determining a count of relevant CV features among the first set of CV features extracted from the first digital image using the mask and (b) using the count of relevant CV features among the first set of CV features extracted from the first digital image as the first measure of abundance of relevant CV features. In one embodiment, the mask comprises binary values. In another embodiment, the mask comprises real values representing different weights. In one embodiment, the subset of CV features identified by the mask represent CV features, from a set of possible CV features, relevant to a particular classifier, as discussed previously.

Figure 18B:
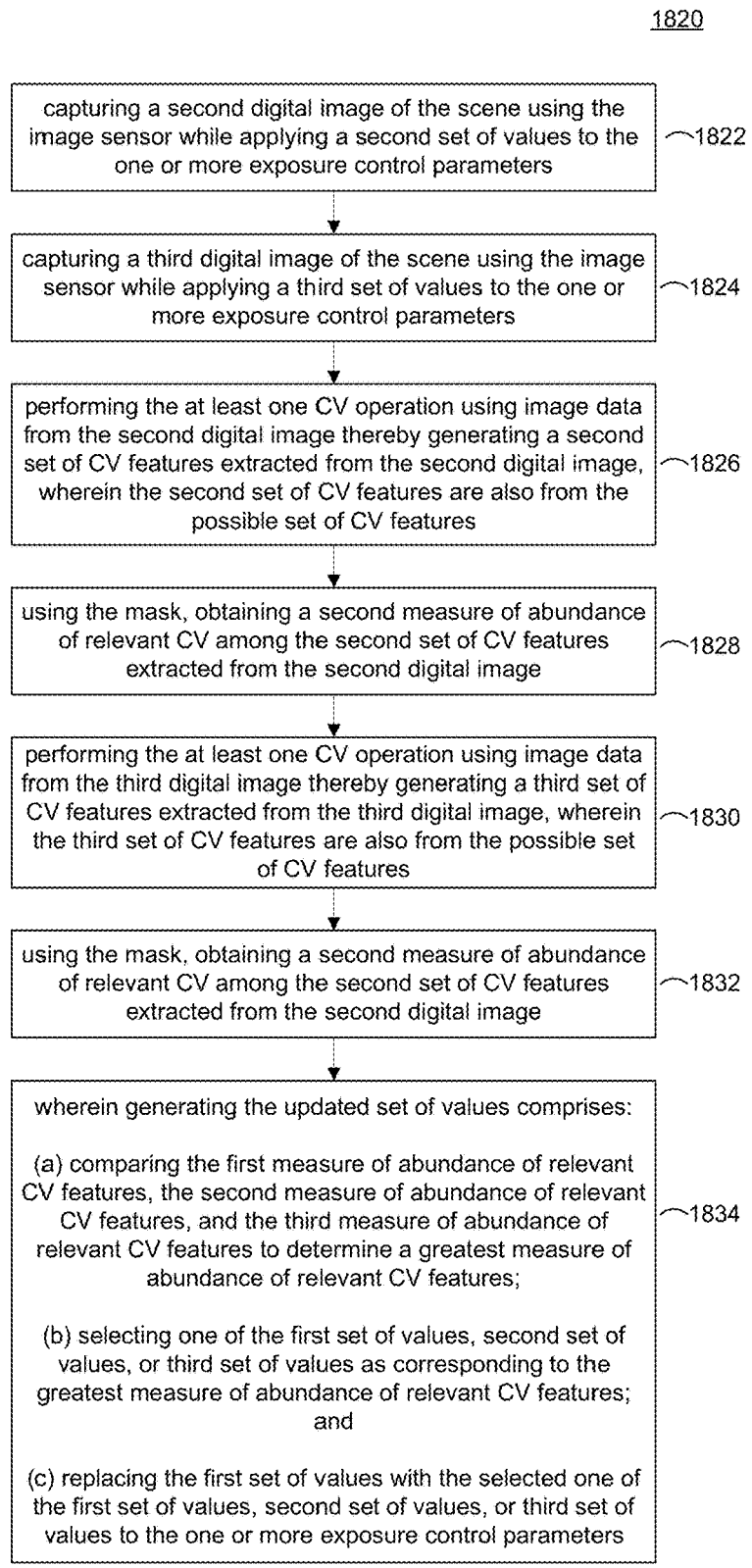
FIG. 18B is a flow chart 1820 showing illustrative steps in a process for performing CV AEC according to an embodiment of the disclosure using three digital images.

FIG. 18B is a flow chart 1820 showing illustrative steps in a process for performing CV AEC according to an embodiment of the disclosure using three digital images. Here, the steps shown in FIG. 18B may be combined with the steps shown in FIG. 18A. Indeed, various features already described in FIG. 18A, such as the first digital image, the mask of relevant CV features, and the updated set of values (to the one ore more exposure control parameters) are referred to again in FIG. 18B. Referring to FIG. 18B, in a step 1822, a second digital image of the scene is captured using the image sensor while applying a second set of values to the one or more exposure control parameters. In a step 1824, a third digital image of the scene is captured using the image sensor while applying a third set of values to the one or more exposure control parameters. Steps 1822 and 1824 may be carried out, for example, by using camera(s) 1920, which is described later in connection with FIG. 19. Here, the first set of values may correspond to a nominal level of exposure. The second set of values may correspond to a level of exposure greater than the nominal level. The third set of values may correspond to a level of exposure less than the nominal level. In a step 1826, the at least one CV operation is performed using image data from the second digital image thereby generating a second set of CV features extracted from the second digital image, wherein the second set of CV features are also from the set of possible CV features. In a step 1828, using the mask, a second measure of abundance of relevant CV is obtained among the second set of CV features extracted from the second digital image. In a step 1830, the at least one CV operation is performed using image data from the third digital image thereby generating a third set of CV features extracted from the third digital image, wherein the third set of CV features are also from the set of possible CV features. In a step 1832, using the mask, a second measure of abundance of relevant CV is obtained among the second set of CV features extracted from the second digital image. In a step 1834, more detailed steps for generating the updated set of values to the one or more exposure control parameters are specified. These include (a) comparing the first measure of abundance of relevant CV features, the second measure of abundance of relevant CV features, and the third measure of abundance of relevant CV features to determine a greatest measure of abundance of relevant CV features and (b) selecting one of the first set of values, second set of values, or third set of values corresponding to the greatest measure of abundance of relevant CV features as the updated set of values. Steps 1826 through 1834 may be carried out, for example by using processor(s) 1904 or other circuitry, which are described later in connection with FIG. 19.

While not explicitly shown in the figures, CV AEC using two digital images may also be implemented according to another embodiment of the disclosure. Steps for CV AEC using a first digital image according to FIG. 18A may be performed. In addition, a second digital image of the scene may be captured using the image sensor while applying a second set of values to the one or more exposure control parameters. The at least one CV operation may be performed using image data from the second digital image thereby generating a second set of CV features extracted from the second digital image, wherein the second set of CV features are also from the set of possible CV features. Using the mask, a second measure of abundance of relevant CV features may be obtained among the second set of CV features extracted from the second digital image. Here, generating the updated set of values may comprise (a) comparing the first measure of abundance of relevant CV features to the second measure of abundance of relevant CV features and (b) in response to the second measure of abundance being greater than the first measure of abundance, selecting the second set of values as the updated set of values.

Figure 18C:
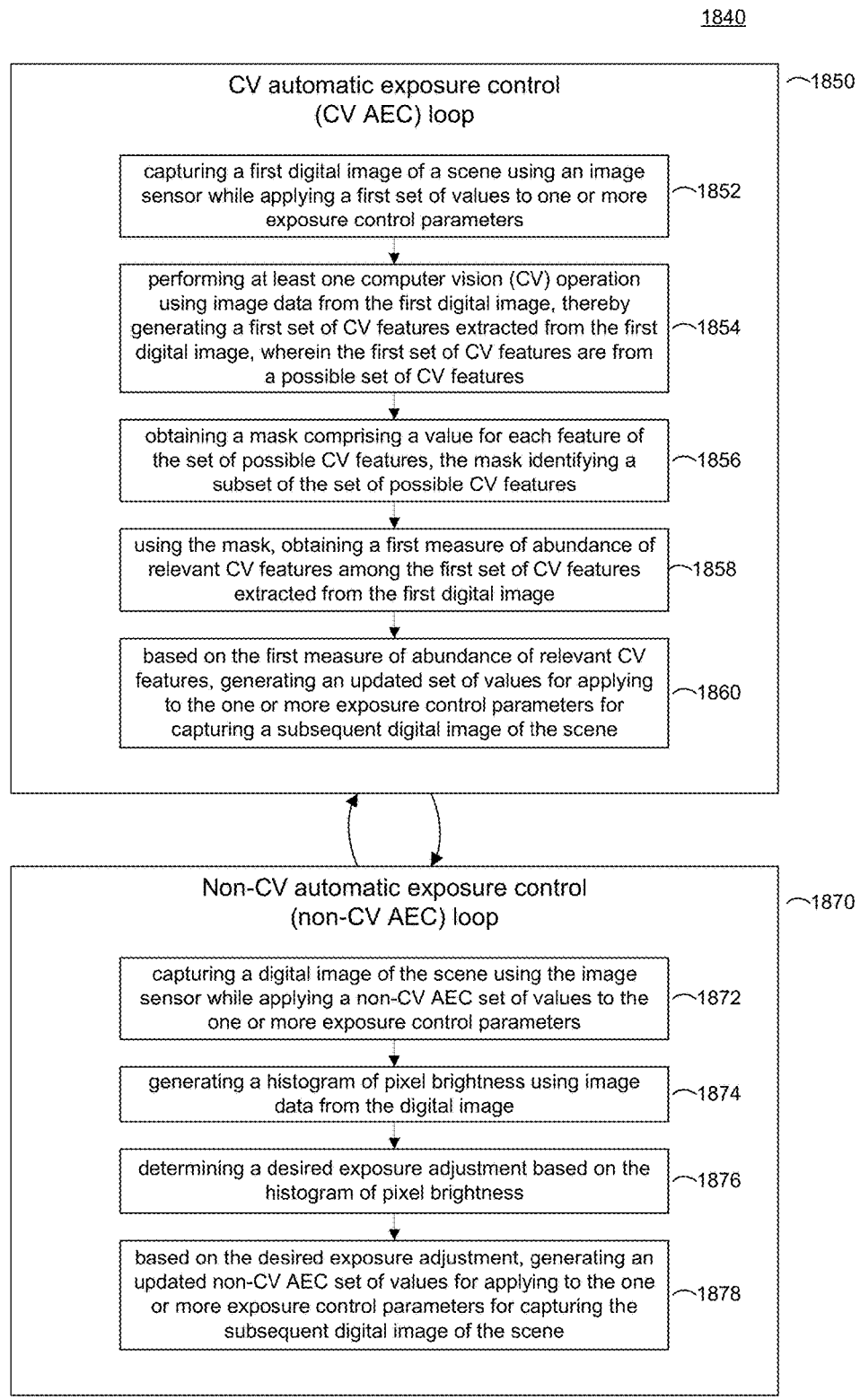
FIG. 18C is a flow chart 1840 showing illustrative steps in a process for performing combined CV AEC and non-CV AEC according to an embodiment of the disclosure.

FIG. 18C is a flow chart 1840 showing illustrative steps in a process for performing combined CV AEC and non-CV AEC according to an embodiment of the disclosure. Here the process comprises two loops, a CV automatic exposure control (CV AEC) loop 1850 and a non-CV automatic exposure control (non-CV AEC) loop 1870. An example of CV AEC loop 1850 is shown in FIG. 17 as the CV AEC control loop 1720. An example of non-CV AEC loop 1870 is shown in FIG. 17 as the non-CV AEC control loop 1710. While in FIG. 17, the non-CV AEC control loop 1710 is performed prior to the CV AEC control loop 1720, the embodiment shown in FIG. 18C does not specify a particular order of operation. Nevertheless, in one specific embodiment, the steps for non-CV AEC loop 1870 are performed prior to the steps for CV AEC loop 1850. In a specific embodiment, non-CV AEC loop 1870 is repeatedly performed until a non-CV AEC target condition is met, and upon meeting the non-CV AEC target condition, CV AEC loop 1850 is performed.

Referring back to FIG. 18C, the steps for CV AEC loop 1850 may be similar to the steps already described in FIG. 18A for performing CV AEC. Specifically, in a step 1852, a first digital image of a scene is captured using an image sensor while applying a first set of values to one or more exposure control parameters. Step 1852 may be carried out, for example, by using camera(s) 1920, which is described later in connection with FIG. 19. In a step 1854, at least one computer vision (CV) operation is performed using image data from the first digital image, thereby generating a first set of CV features extracted from the first digital image, wherein the first set of CV features are from a set of possible CV features. In a step 1856, a mask is obtained comprising a value for each feature of the set of possible CV features. In a step 1858, using the mask, a first measure of abundance is obtained of relevant CV features among the first set of CV features extracted from the first digital image. In a step 1860, based on the first measure of abundance of relevant CV features, an updated set of values is generated for applying to the one or more exposure control parameters for capturing a subsequent digital image of the scene. Steps 1854 through 1860 may be carried out, for example by using processor(s) 1904 or other circuitry, which are described later in connection with FIG. 19.

Referring again to FIG. 18C, non-CV AEC loop 1870 may comprise a number of steps. For example, in a step 1872, a digital image of the scene is captured using the image sensor while applying a non-CV AEC set of values to the one or more exposure control parameters. Step 1872 may be carried out, for example, by using camera(s) 1920, which is described later in connection with FIG. 19. In a step 1874, a histogram of pixel brightness is generated using image data from the digital image. In a step 1876, a desired exposure adjustment is determined based on the histogram of pixel brightness. In a step 1878, based on the desired exposure adjustment, an updated non-CV AEC set of values is generated for applying to the one or more exposure control parameters for capturing the subsequent digital image of the scene. Steps 1874 through 1878 may be carried out, for example by using processor(s) 1904 or other circuitry, which are described later in connection with FIG. 19.

According to one embodiment, the histogram of pixels may comprise a first bin associated with a first range of brightness values and a second bin associated with a second range of brightness values. The desired exposure adjustment may be determined based on at least one brightness ratio based on (a) a dark-bin value representing a pixel count of the first bin and (b) a bright-bin value representing a pixel count of the second bin. An example of such an embodiment is referred to as "Frame Average AEC" which is described previously.

According to another embodiment, the histogram of pixel brightness may further comprise a third bin associated with a third range of brightness values and a fourth bin associated with a fourth range of brightness value. The at least one brightness ratio may comprise a limited brightness ratio based on (a) the dark-bin value and (b) the bright-bin value, as well as an expanded brightness ratio based on (a) the dark-bin value and a black-bin value representing a pixel count of the third bin and (b) the bright-bin value and a white-bin value representing a pixel count of the fourth bin. An example of such an embodiment is referred to "Filtered Frame Average AEC" which is described previously, e.g., with respect to FIGS. 7A, 7B, and 8.

Determining the desired exposure adjustment may further comprise selecting either the limited brightness ratio or the expanded brightness ratio, based on a comparison of (a) a value including the dark-bin value and the bright-bin value and (b) a value including the black-bin value and the white-bin value, as a selected brightness ratio, as well as using the selected brightness ratio to determine the desired exposure adjustment.

Figure 19:
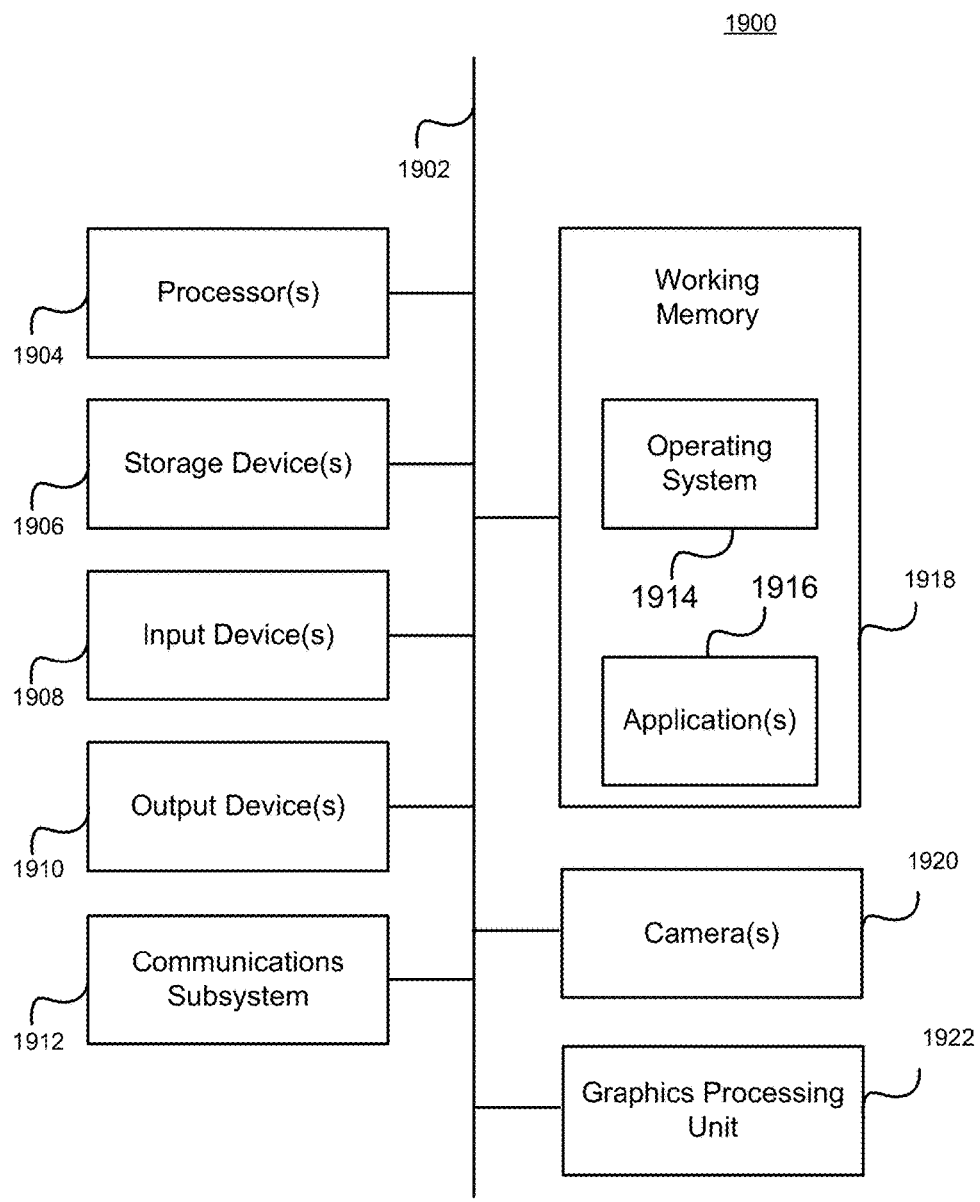
FIG. 19 illustrates an example computer system 1900 that can be used to implement features of the disclosure.

FIG. 19 illustrates an example computer system 1900 that can be used to implement features of the disclosure. Computer system 1900 is shown comprising hardware elements that can be electrically coupled via a bus 1902 (or may otherwise be in communication, as appropriate). The hardware elements may include one or more processors 1904, including without limitation one or more general-purpose processors and/or one or more special-purpose processors (such as digital signal processing chips, graphics processing units 1922, and/or the like); one or more input devices 1908, which can include without limitation one or more cameras, sensors, a mouse, a keyboard, a microphone configured to detect ultrasound or other sounds, and/or the like; and one or more output devices 1910, which can include without limitation a display unit such as the device used in implementations of the invention, a printer and/or the like. Additional cameras 1920 may be employed for detection of user's extremities and gestures. In some implementations, input devices 1908 may include one or more sensors such as infrared, depth, and/or ultrasound sensors. The graphics processing unit 1922 may be used to carry out the method for real-time wiping and replacement of objects described above. According to certain embodiments of the disclosure, an image sensor for capturing a digital image on which automatic exposure control (AEC) is performed may be part of camera(s) 1920. Additional digital images captured for performing AEC may also be captured using the same image sensor that is part of camera(s) 1920.

In some implementations of the implementations of the invention, various input devices 1908 and output devices 1910 may be embedded into interfaces such as display devices, tables, floors, walls, and window screens. Furthermore, input devices 1908 and output devices 1910 coupled to the processors may form multi-dimensional tracking systems.

The computer system 1900 may further include (and/or be in communication with) one or more non-transitory storage devices 1906, which can comprise, without limitation, local and/or network accessible storage, and/or can include, without limitation, a disk drive, a drive array, an optical storage device, a solid-state storage device such as a random access memory (RAM) and/or a read-only memory (ROM), which can be programmable, flash-updateable and/or the like. Such storage devices may be configured to implement any appropriate data storage, including without limitation, various file systems, database structures, and/or the like.

The computer system 1900 might also include a communications subsystem 1912, which can include without limitation a modem, a network card (wireless or wired), an infrared communication device, a wireless communication device and/or chipset (such as a Bluetooth device, an 802.11 device, a WiFi device, a WiMax device, cellular communication facilities, etc.), and/or the like. The communications subsystem 1912 may permit data to be exchanged with a network, other computer systems, and/or any other devices described herein. In many implementations, the computer system 1900 will further comprise a non-transitory working memory 1920, which can include a RAM or ROM device, as described above.

The computer system 1900 also can comprise software elements, shown as being currently located within the working memory 1920, including an operating system 1914, device drivers, executable libraries, and/or other code, such as one or more application programs 1916, which may comprise computer programs provided by various implementations, and/or may be designed to implement methods, and/or configure systems, provided by other implementations, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer-readable storage medium, such as the storage device(s) 1906 described above. In some cases, the storage medium might be incorporated within a computer system, such as computer system 1900. In other implementations, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which may be executable by the computer system 1900 and/or might take the form of source and/or installable code, which, upon compilation and/or installation on the computer system 1900 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed. In some implementations, one or more elements of the computer system 1900 may be omitted or may be implemented separate from the illustrated system. For example, the processor 1904 and/or other elements may be implemented separate from the input device 1908. In one implementation, the processor may be configured to receive images from one or more cameras that are separately implemented. In some implementations, elements in addition to those illustrated in FIG. 4 may be included in the computer system 1900.

Some implementations may employ a computer system (such as the computer system 1900) to perform methods in accordance with the disclosure. For example, some or all of the procedures of the described methods may be performed by the computer system 1900 in response to processor 1904 executing one or more sequences of one or more instructions (which might be incorporated into the operating system 1914 and/or other code, such as an application program 1916) contained in the working memory 1920. Such instructions may be read into the working memory 1920 from another computer-readable medium, such as one or more of the storage device(s) 1906. Merely by way of example, execution of the sequences of instructions contained in the working memory 1920 might cause the processor(s) 1904 to perform one or more procedures of the methods described herein.

For example, according to various embodiments of the disclosure, at least one processor such as processor(s) 1904, while executing one or more sequences of one or more instructions contained in the working memory 1920, may carry out various steps for implementing AEC, including CV AEC and non-CV AEC. Alternatively or additionally, circuitry not part of processor(s) 1904 may also be used to perform various steps for implementing AES. Such circuitry may include peripheral circuitry disposed around or near the image sensor that is part of camera(s) 1920. Such peripheral circuitry may be configured to perform CV operations and generate CV features in a manner that is more power-efficient than processor(s) 1904. For example, processor(s) 1904 or other circuitry may be configured to (a) apply a first set of values to one or more exposure control parameters while a first digital image is captured, (b) perform at least one computer vision (CV) operation using image data from the first digital image, thereby generating a first set of CV features extracted from the first digital image, wherein the first set of CV features are from a set of possible CV features, (c) obtain a mask comprising a value for each feature of the set of possible CV features; (d) using the mask, obtain a first measure of abundance of relevant CV features among the first set of CV features extracted from the first digital image; and (e) based on the first measure of abundance of relevant CV features, generate an updated set of values for applying to the one or more exposure control parameters for capturing a subsequent digital image of the scene.

The terms "machine-readable medium" and "computer-readable medium," as used herein, refer to any medium that participates in providing data that causes a machine to operate in a specific fashion. In some implementations implemented using the computer system 1900, various computer-readable media might be involved in providing instructions/code to processor(s) 1904 for execution and/or might be used to store and/or carry such instructions/code (e.g., as signals). In many implementations, a computer-readable medium may be a physical and/or tangible storage medium. Such a medium may take many forms, including but not limited to, non-volatile media, volatile media, and transmission media. Non-volatile media include, for example, optical and/or magnetic disks, such as the storage device(s) 1906. Volatile media include, without limitation, dynamic memory, such as the working memory 1920. Transmission media include, without limitation, coaxial cables, copper wire and fiber optics, including the wires that comprise the bus 1902, as well as the various components of the communications subsystem 1912 (and/or the media by which the communications subsystem 1912 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a floppy disk, a flexible disk, hard disk, magnetic tape, or any other magnetic medium, a CD-ROM, any other optical medium, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to the processor(s) 1904 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 1900. These signals, which might be in the form of electromagnetic signals, acoustic signals, optical signals and/or the like, are all examples of carrier waves on which instructions can be encoded, in accordance with various implementations of the invention.

The communications subsystem 1912 (and/or components thereof) generally will receive the signals, and the bus 1902 then might carry the signals (and/or the data, instructions, etc. carried by the signals) to the working memory 1920, from which the processor(s) 1904 retrieves and executes the instructions. The instructions received by the working memory 1920 may optionally be stored on a non-transitory storage device either before or after execution by the processor(s) 1904.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Moreover, nothing disclosed herein is intended to be dedicated to the public.

While some examples of methods and systems herein are described in terms of software executing on various machines, the methods and systems may also be implemented as specifically-configured hardware, such as field-programmable gate array (FPGA) specifically to execute the various methods. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example computer-readable storage media, that may store instructions that, when executed by the processor, can cause the processor to perform the steps described herein as carried out, or assisted, by a processor. Examples of computer-readable media may include, but are not limited to, an electronic, optical, magnetic, or other storage device capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code for carrying out one or more of the methods (or parts of methods) described herein.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure.

The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

What is claimed is:

1. A method for performing automatic exposure control (AEC) comprising:
    capturing a first digital image of a scene using an image sensor while applying a first set of values to one or more exposure control parameters;
    performing object detection on the first digital image, wherein the object detection identifies one or more objects in the first digital image, wherein the object detection outputs a first set of features extracted from the first digital image, wherein a feature is a numerical value indicating gradients between a set of neighboring pixels, and wherein the first set of features includes a count of occurrences in the first digital image of each feature of a set of possible features;
    obtaining a mask associated with one or more objects in the first digital image, the mask having a zero value or a non-zero value for each feature of the set of possible features, wherein the mask has a non-zero value for each feature of the set of possible features that is used by the object detection to classify contents of an image as the one or more objects;
    applying the mask to the first set of features to determine a subset of the first set of features, the subset of the first set of features including each feature from the first set of features that corresponds to a non-zero value in the mask;
    computing a first score using the subset of the first set of features; and
    generating, based on the first score, an updated set of values for applying to the one or more exposure control parameters for capturing a subsequent digital image of the scene.

2. The method of claim 1, further comprising:
    capturing a second digital image of the scene using the image sensor while applying a second set of values to the one or more exposure control parameters;
    performing object detection on the second digital image, wherein the object detection identifies the one or more objects in the second digital image, wherein the object detection outputs a second set of features extracted from the second digital image, the second set of features including a second count of occurrences in the second digital image of each feature of the set of possible features;
    applying the mask to the second set of features to determine a subset of the second set of features;
    computing a second score using the subset of the second set of features; and
    comparing the first score to the second score, wherein generating the updated set of values further includes selecting the second set of values as the updated set of values based on the second score being greater than the first score.

3. The method of claim 1, wherein the first set of values corresponds to a nominal level of exposure, and further comprising:
    capturing a second digital image of the scene using the image sensor while applying a second set of values to the one or more exposure control parameters, wherein the second set of values correspond to a level of exposure greater than the nominal level;
    capturing a third digital image of the scene using the image sensor while applying a third set of values to the one or more exposure control parameters, wherein the third set of values correspond to a level of exposure less than the nominal level;
    performing object detection on the second digital image, wherein the object detection identifies the one or more objects in the second digital image, wherein the object detection outputs a second set of features extracted from the second digital image, the second set of features including a second count of occurrences in the second digital image of each feature of the set of possible features;
    applying the mask to the second set of features to determine a subset of the second set of features;
    determining a second score using the subset of the second set of features;
    performing object detection on the third digital image, wherein the object detection identifies the one or more objects in the third digital image, wherein the object detection outputs a third set of features extracted from the third digital image, the third set of features including a third count of occurrences in the third digital image of each feature from of the set of possible features;
    applying the mask to the third set of features to determine a subset of the third set of features;
    determining a third score using the subset of the third set of features; and
    comparing the first score, the second score, and the third score to determine a largest score wherein generating the updated set of values further includes selecting, as the updated set of values, one of the first set of values, second set of values, or third set of values corresponding to the largest score.

4. The method of claim 1, wherein the mask comprises binary values.

5. The method of claim 1, wherein the mask comprises real values representing weights.

6. The method of claim 1, further comprising
    capturing a digital image of the scene using the image sensor while applying an alternate set of values to the one or more exposure control parameters;
    generating a histogram of pixel brightness using image data from the digital image;
    determining a desired exposure adjustment based on the histogram of pixel brightness;
    generating an updated alternate set of values for applying to the one or more exposure control parameters; and
    capturing a next digital image of the scene until a target condition is met, wherein each next digital image of the scene is captured using a different alternate set of values updated according to a respective histogram of pixel brightness for the next digital image.

7. The method of claim 6, wherein the first digital image is captured subsequent to the target condition being met.

8. The method of claim 6, wherein the histogram of pixel brightness comprises a first bin associated with a first range of brightness values and a second bin associated with a second range of brightness values, and wherein the desired exposure adjustment is determined based on a first ratio between a dark-bin value representing a pixel count of the first bin and a bright-bin value representing a pixel count of the second bin.

9. The method of claim 8, wherein the histogram of pixel brightness further comprises a third bin associated with a third range of brightness values and a fourth bin associated with a fourth range of brightness values, and wherein the desired exposure adjustment is further based on a second ratio between the dark-bin value and a black-bin value representing a pixel count of the third bin and the bright-bin value and a white-bin value representing a pixel count of the fourth bin.

10. The method of claim 9, further comprising:
comparing a first value including the dark-bin value and the bright-bin value and a second value including the black-bin value and the white-bin value;
selecting the first ratio or the second ratio based on a result of comparing the first value and the second value; and
using the selected ratio to determine the desired exposure adjustment.

11. The method of claim 1, further comprising:
capturing a next digital image of the scene until a score determined for the next digital image is greater than a threshold, wherein the next digital image is captured while applying a last set of values to the one or more exposure control parameters determines using a previous digital image.

12. The method of claim 4, wherein determining the first score includes summing each count for each feature in the subset of the first set of features.

13. The method of claim 5, wherein determining the first score includes summing results of multiplying each count for each feature in the subset of the first set of features by a corresponding weight from the mask.

14. An apparatus for performing automatic exposure control (AEC) comprising:
an image sensor for capturing a first digital image of a scene;
at least one processor or circuitry coupled to the image sensor and configured to;
apply a first set of values to one or more exposure control parameters while the first digital image is captured;
perform object detection on the first digital image, wherein the object detection identifies one or more objects in the first digital image, wherein the object detection outputs a first set of features extracted from the first digital image, wherein a feature is a numerical value indicating gradients between a set of neighboring pixels, and wherein the first set of features includes a count of occurrences in the first digital image of each feature of a set of possible features;
obtain a mask associated with one or more objects in the first digital image, the mask having a zero value or a non-zero value for each feature of the set of possible features, wherein the mask has a non-zero value for each feature of the set of possible features that is used by the object detection to classify contents of an image as the one or more objects;
apply the mask to the first set of features to determine a subset of the first set of features, the subset of the first set of features including each feature from the first set of features that corresponds to a non-zero value in the mask;
compute a first score using the subset of the first set of features; and
generate, based on the first score, an updated set of values for applying to the one or more exposure control parameters for capturing a subsequent digital image of the scene.

15. The apparatus of claim 14, wherein the at least one processor or circuitry is further configured to:
capture a second digital image of the scene using the image sensor while applying a second set of values to the one or more exposure control parameters;
perform object detection on the second digital image, wherein the object detection identifies the one or more objects in the second digital image, wherein the object detection outputs a second set of features extracted from the second digital image, the second set of features including a second count of occurrences in the second digital image of each feature of set of possible features;
apply the mask to the second set of features to determine a subset of the second set of features;
compute a second score using the subset of the second set of features; and
compare the first score to the second score, wherein generating the updated set of values further includes selecting the second set of values as the updated set of values based on the second score being greater than the first score.

16. The apparatus of claim 14, wherein the first set of values corresponds to a nominal level of exposure, and wherein the at least one processor or circuitry is further configured to:
capture a second digital image of the scene using the image sensor while applying a second set of values to the one or more exposure control parameters, wherein the second set of values correspond to a level of exposure greater than the nominal level;
capture a third digital image of the scene using the image sensor while applying a third set of values to the one or more exposure control parameters, wherein the third set of values correspond to a level of exposure less than the nominal level;
perform object detection on the second digital image, wherein the object detection identifies the one or more objects in the second digital image, wherein the object detection outputs a second set of features extracted from the second digital image, the second set of features including a second count of occurrences in the second digital image of each feature of the set of possible features;
apply the mask to the second set of features to determine a subset of the second set of features;
determine a second score using the subset of the second set of features;
perform object detection on the third digital image, wherein the object detection identifies the one or more objects in the third digital image, wherein the object detection outputs a third set of features extracted from the third digital image, the third set of features including a third count of occurrences in the third digital image of each feature from of the set of possible features;

apply the mask to the third set of features to determine a subset of the third set of features;

determine a third score using the subset of the third set of features; and compare the first score, the second score, and the third score to determine a largest score wherein generating the updated set of values further includes selecting, as the updated set of values, one of the first set of values, second set of values, or third set of values corresponding to the largest score.

17. The apparatus of claim 14, wherein the mask comprises binary values.

18. The apparatus of claim 14, wherein the mask comprises real values representing weights.

19. The apparatus of claim 14, wherein the at least one processor or circuitry is further configured to:

capture a digital image of the scene using the image sensor while applying an alternate set of values to the one or more exposure control parameters;

generate a histogram of pixel brightness using image data from the digital image;

determine a desired exposure adjustment based on the histogram of pixel brightness;

generate an updated alternate set of values for applying to the one or more exposure control parameters; and capture next digital image of the scene until a target condition is met, wherein each next digital image of the scene is captured using a different alternate set of values updated according to a respective histogram of pixel brightness for the next digital image.

20. The apparatus of claim 19, the first digital image is captured subsequent to the target condition being met.

21. The apparatus of claim 19, wherein the histogram of pixel brightness comprises a first bin associated with a first range of brightness values and a second bin associated with a second range of brightness values, and wherein the at least one processor or circuitry is configured determine the desired exposure adjustment based on a first ratio between a dark-bin value representing a pixel count of the first bin and a bright-bin value representing a pixel count of the second bin.

22. The apparatus of claim 21, wherein the histogram of pixel brightness further comprises a third bin associated with a third range of brightness values and a fourth bin associated with a fourth range of brightness values, and wherein the desired exposure adjustment is further based on a second ratio between the dark-bin value and a black-bin value representing a pixel count of the third bin and the bright-bin value and a white-bin value representing a pixel count of the fourth bin.

23. The apparatus of claim 22, wherein the at least one processor or circuitry is configured to:

compare a first value including the dark-bin value and the bright-bin value and a second value including the black-bin value and the white-bin value;

select the first ratio or the second ratio based on a result of comparing the first value to the second value; and use the selected ratio to determine the desired exposure adjustment.

24. The apparatus of claim 14, wherein the at least one processor or circuitry is further configured to:

capture a next digital image of the scene until a score determined for the next digital image is greater than a threshold, wherein the next digital image is captured while applying a last set of values to the one or more exposure control parameters determines using a previous digital image.

25. The apparatus of claim 17, wherein determining the first score includes summing each count for each feature in the subset of the first set of features.

26. The apparatus of claim 18, wherein determining the first score includes summing results of multiplying each count for each feature in the subset of the first set of features by a corresponding weight from the mask.

27. A non-transitory computer readable medium having instructions stored thereon that, when carried out by one or more processors, causes the one or more processors to:

capture a first digital image of a scene using an image sensor while applying a first set of values to one or more exposure control parameters;

perform object detection on the first digital image, wherein the object detection identifies one or more objects in the first digital image, wherein the object detection outputs a first set of features extracted from the first digital image, wherein a feature is a numerical value indicating gradients between a set of neighboring pixels, and wherein the first set of features includes a count of occurrences in the first digital image of each feature of a set of possible features;

obtain a mask associated with one or more objects in the first digital image, the mask having a zero value or a non-zero value for each feature of the set of possible features, wherein the mask has a non-zero value for each feature of the set of possible features that is used by the object detection to classify contents of an image as the one or more objects;

apply the mask to the first set of features to determine a subset of the first set of features, the subset of the first set of features including each feature from the first set of features that corresponds to a non-zero value in the mask;

compute a first score using the subset of the first set of features; and generate, based on the first score, an updated set of values for applying to the one or more exposure control parameters for capturing a subsequent digital image of the scene.

28. The non-transitory computer readable medium of claim 27, wherein the first set of values corresponds to a nominal level of exposure, and wherein the instructions, when carried out by the one or more processors, further cause the one or more processors to:

capture a second digital image of the scene using the image sensor while applying a second set of values to the one or more exposure control parameters, wherein the second set of values correspond to a level of exposure greater than the nominal level;

capture a third digital image of the scene using the image sensor while applying a third set of values to the one or more exposure control parameters, wherein the third set of values correspond to a level of exposure less than the nominal level;

perform object detection on the second digital image, wherein the object detection identifies the one or more objects in the second digital image, wherein the object detection outputs a second set of features extracted from the second digital image, the second set of features including a second count of occurrences in the second digital image of each feature of the set of possible features;

apply the mask to the second set of features to determine a subset of the second set of features;

determine a second score using the subset of the second set of features;

perform object detection on the third digital image, wherein the object detection identifies the one or more objects in the third digital image, wherein the object detection outputs a third set of features extracted from the third digital image, the third set of features including a third count of occurrences in the third digital image of each feature from of the set of possible features;

apply the mask to the third set of features to determine a subset of the third set of features;

determine a third score using the subset of the third set of features; and compare the first score, the second score, and the third score to determine a largest score wherein generating the updated set of values further includes selecting, as the updated set of values, one of the first set of values, second set of values, or third set of values corresponding to the largest score.

29. The non-transitory computer readable medium of claim 27, wherein the instructions, when carried out by the one or more processors, further cause the one or more processors to:

capture a digital image of the scene using the image sensor while applying an alternate set of values to the one or more exposure control parameters;

generate a histogram of pixel brightness using image data from the digital image;

determine a desired exposure adjustment based on the histogram of pixel brightness;

generate an updated alternate set of values for applying to the one or more exposure control parameters; and capture next digital image of the scene until a target condition is met, wherein each next digital image of the scene is captured using a different alternate set of values updated according to a respective histogram of pixel brightness for the next digital image.

30. A system for performing automatic exposure control (AEC) comprising:

means for capturing a first digital image of a scene using an image sensor while applying a first set of values to one or more exposure control parameters;

means for performing object detection on the first digital image, wherein the object detection identifies one or more objects in the first digital image, wherein the object detection outputs a first set of features extracted from the first digital image, wherein a feature is a numerical value indicating gradients between a set of neighboring pixels, and wherein the first set of features includes a count of occurrences in the first digital image of each feature of a set of possible features;

means for obtaining a mask associated with one or more objects in the first digital image, the mask having a zero value or a non-zero value for each feature of the set of possible features, wherein the mask has a non-zero value for each feature of the set of possible features that is used by the object detection to classify contents of an image as the one or more objects;

means for applying the mask to the first set of features to determine a subset of the first set of features, the subset of the first set of features including each feature from the first set of features that corresponds to a non-zero value in the mask;

means for computing a first score using the subset of the first set of features; and means for generating, based on the first score, an updated set of values for applying to the one or more exposure control parameters for capturing a subsequent digital image of the scene.

* * * * *